US009215427B2

(12) United States Patent
Hirai et al.

(10) Patent No.: US 9,215,427 B2
(45) Date of Patent: Dec. 15, 2015

(54) ATTACHED MATTER DETECTOR AND IN-VEHICLE DEVICE CONTROLLER USING THE SAME

(71) Applicants: Hideaki Hirai, Yokohama (JP); Izumi Itoh, Machida (JP); Masanori Kobayashi, Yokohama (JP)

(72) Inventors: Hideaki Hirai, Yokohama (JP); Izumi Itoh, Machida (JP); Masanori Kobayashi, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 427 days.

(21) Appl. No.: 13/763,980

(22) Filed: Feb. 11, 2013

(65) Prior Publication Data
US 2013/0208120 A1 Aug. 15, 2013

(30) Foreign Application Priority Data

Feb. 13, 2012 (JP) ................................. 2012-028894
Nov. 28, 2012 (JP) ................................. 2012-259713

(51) Int. Cl.
*H04N 7/18* (2006.01)
*B60S 1/08* (2006.01)
*G06K 9/00* (2006.01)

(52) U.S. Cl.
CPC ................ *H04N 7/18* (2013.01); *B60S 1/0844* (2013.01); *G06K 9/00825* (2013.01)

(58) Field of Classification Search
CPC ..... H04N 7/18; B60S 1/0844; G06K 9/00825
USPC ........................................................ 348/148
See application file for complete search history.

(56) References Cited

U.S. PATENT DOCUMENTS

| 7,208,723 | B2 | 4/2007 | Takenaga et al. |
| 7,247,838 | B2 | 7/2007 | Takenaga et al. |
| 7,253,898 | B2* | 8/2007 | Saikalis et al. ................ 356/338 |
| 2003/0001121 | A1* | 1/2003 | Hochstein ..................... 250/573 |
| 2005/0035926 | A1* | 2/2005 | Takenaga et al. ................. 345/8 |
| 2010/0208060 | A1 | 8/2010 | Kobayashi et al. |

FOREIGN PATENT DOCUMENTS

| JP | 2006-107000 | 4/2006 |
| JP | 4326999 | 6/2009 |
| JP | 2011-240848 | 12/2011 |

* cited by examiner

*Primary Examiner* — Michael Lee
(74) *Attorney, Agent, or Firm* — Oblon, McClelland, Maier & Neustadt, L.L.P.

(57) ABSTRACT

An attached matter detector includes a light source; an imager receiving transmitted light from a predetermined imaging region on a light-receiving region for an imaging region and imaging an image of the imaging region, and receiving reflected light on a light-receiving region for attached matter detection when light from the light source is reflected by attached matter and imaging an image of the attached matter; a parameter calculator of an image for an attached matter image region calculating a parameter of an image for an attached matter image region as information of an image region of the attached matter; a parameter calculator of an image for an imaging region calculating a parameter of an image for an imaging region as information of the imaging region; and an output device of an attached matter state signal outputting a signal showing a state of the attached matter based on the calculated parameters.

14 Claims, 14 Drawing Sheets

DETECTION OPERATION OF PARAMETER IN IMAGE REGION FOR VEHICLE DETECTION

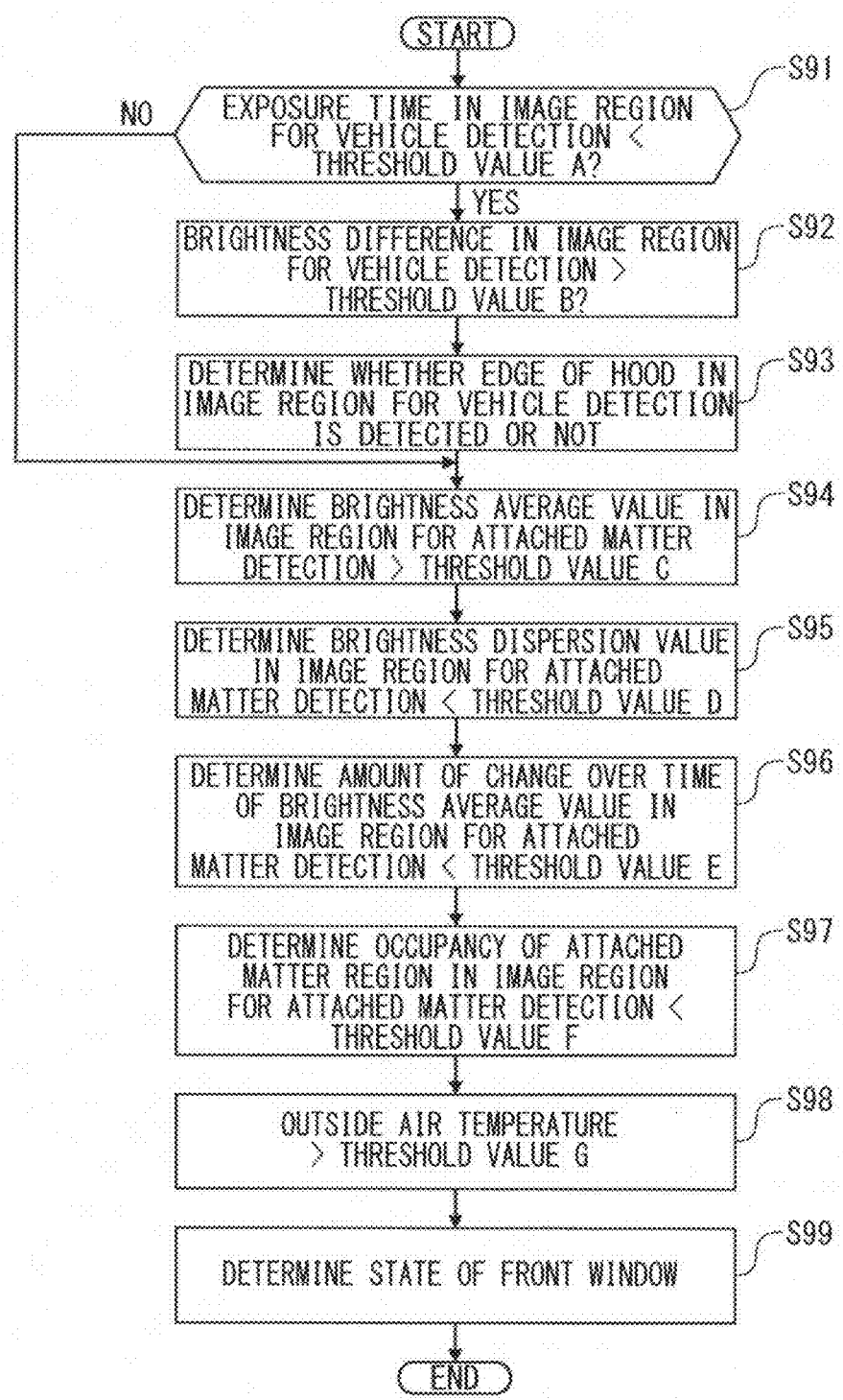

FIG.23

| RESULT OF DETERMINATION | DAYTIME | | | | | | | NIGHTTIME | | | | | | |
|---|---|---|---|---|---|---|---|---|---|---|---|---|---|---|
| | NORMAL | DRIZZLE | RAIN | HEAVY RAIN | SPLASH | FOGGING | FREEZING | NORMAL | DRIZZLE | RAIN | HEAVY RAIN | SPLASH | FOGGING | FREEZING |
| EXPOSURE TIME IN IMAGE REGION FOR VEHICLE DETECTION < THRESHOLD VALUE A | NO | NO | NO | NO | NO | NO | NO | YES | YES | YES | YES | YES | YES | YES |
| BRIGHTNESS DIFFERENCE IN IMAGE REGION FOR VEHICLE DETECTION > THRESHOLD VALUE B | YES | YES | YES | NO | NO | NO | NO | NON USE | NON USE | NON USE | NON USE | NON USE | NON USE | NON USE |
| IS HORIZONTAL EDGE COMPONENT OF EDGE PART OF HOOD IN IMAGE REGION FOR VEHICLE DETECTION DETECTED? | YES | YES | YES | NO | NO | NO | NO | NON USE | NON USE | NON USE | NON USE | NON USE | NON USE | NON USE |
| BRIGHTNESS AVERAGE VALUE IN IMAGE REGION FOR ATTACHED MATTER DETECTION > THRESHOLD VALUE C | NO | YES | YES | YES | YES | YES | YES | NO | NO | NO | NO | YES | YES | YES |
| BRIGHTNESS DISPERSION VALUE IN IMAGE REGION FOR ATTACHED MATTER DETECTION < THRESHOLD VALUE D | NO | YES | YES | YES | YES | NO | YES | YES | YES | YES | YES | YES | YES | YES |
| AMOUNT OF CHANGE OVER TIME OF BRIGHTNESS AVERAGE VALUE IN IMAGE REGION FOR ATTACHED MATTER DETECTION < THRESHOLD VALUE E | YES | YES | YES | YES | NO | YES | YES | YES | YES | YES | YES | NO | YES | YES |
| OCCUPANCY OF ATTACHED MATTER REGION IN IMAGE REGION FOR ATTACHED MATTER DETECTION < THRESHOLD VALUE F | YES | YES | YES | YES | YES | YES | NO | YES | YES | YES | NO | NO | NO | NO |
| OUTSIDE AIR TEMPERATURE > THRESHOLD VALUE G | YES | YES | YES | YES | YES | YES | NO | YES | YES | YES | YES | YES | YES | NO |

FIG.24
| STATE | WINDSHIELD WIPER CONTROL | DEFROSTER CONTROL |
|---|---|---|
| NORMAL | NOT OPERATED | NOT OPERATED |
| DRIZZLE | OPERATED SLOW SPEED | NOT OPERATED |
| RAIN | OPERATED MEDIUM SPEED | NOT OPERATED |
| HEAVY RAIN | OPERATED FAST SPEED | NOT OPERATED |
| SPLASH | OPERATED FAST SPEED | NOT OPERATED |
| FOGGING | OPERATED SLOW SPEED | OPERATED |
| FREEZING | NOT OPERATED | OPERATED |
FIG.25A
PRIOR ART
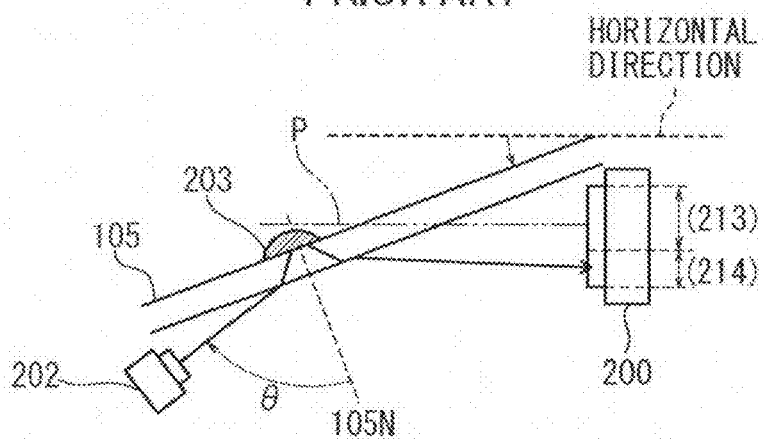
FIG.25B
PRIOR ART
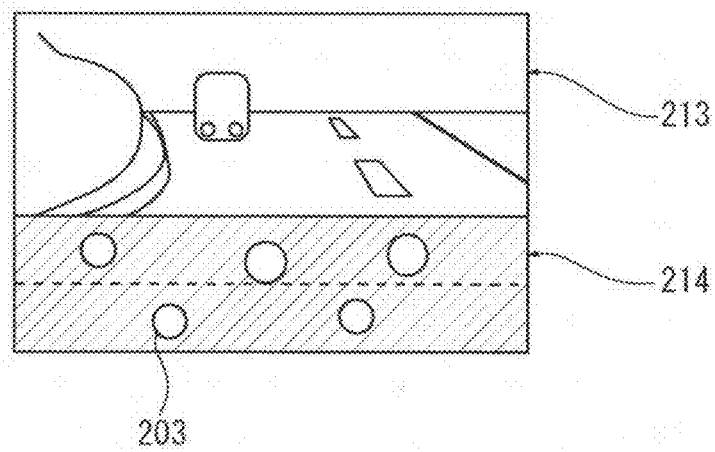

ATTACHED MATTER DETECTOR AND IN-VEHICLE DEVICE CONTROLLER USING THE SAME

CROSS-REFERENCE TO RELATED APPLICATIONS

The present application is based on and claims priority from Japanese Patent Application Numbers 2012-028894, filed Feb. 13, 2012, and 2012-259713, filed Nov. 28, 2012, the disclosures of which are hereby incorporated by reference herein in their entireties.

BACKGROUND

The present invention relates to an attached matter detector that detects matter attached on a transparent member based on an image imaged by an imager, and an in-vehicle device controller using the attached matter detector.

Japanese Patent No. 4326999 discloses an image-processing system (attached matter detector) that detects foreign matter (attached matter) such as a liquid drop such as a raindrop, or the like, fogging, dust, and the like attached on surfaces of glasses used for a vehicle, a vessel, an airplane, and the like, or various types of window glass (transparent members) such as window glass used in a building, and so on. In this image-processing system, light is emitted to a front window of a driver's vehicle from a light source placed in an interior of the driver's vehicle, and an image sensor receives reflected light of the light emitted to the front window, and images an image. Then, the imaged image is analyzed, and whether foreign matter such as a raindrop, or the like is attached on the front window is determined. In particular, an edge detection operation is performed on an image signal of the imaged image when lighting the light source by using a Laplacian filter, or the like, and an edge image is created in which a boundary between an image region of a raindrop and an image region of a non-raindrop region is enhanced. And then, the Generalized Hough Transform is performed on the edge image, round-shape image regions are detected, the number of detected round-shapes is counted, the number of the detected round-shapes is converted to an amount of rain, and the amount of rain is calculated.

In Japanese Patent Application No. 2011-240848 (Hereinafter, referred to as "prior application"), the applicant of the present invention proposed an imaging unit that images an image in which a front region of a driver's vehicle is taken as an imaging region via a front window, and images an image of a raindrop attached on an outer surface of the front window. The imaging unit according to the prior application will be explained with reference to the drawings below.

FIG. 25A is an explanatory diagram illustrating a light path of light that is emitted from a light source 202, reflected by a raindrop 203, and incident to an imaging device 200. FIG. 25B is an explanatory diagram illustrating an example of an image of imaged image data.

The imaging unit of the prior application includes the imaging device 200, and the light source 202, and is placed on a side of an inner surface of a front window 105 of the driver's vehicle. As to the imaging device 200, so as to image a predetermined imaging region (a front region of the vehicle), an angle is adjusted such that an imaging direction (an optical axis direction of an imaging lens) P of the imaging device 200 faces a specified direction. Therefore, as illustrated in FIG. 25B, the front region of the vehicle is appropriately shown in an image region for vehicle detection 213.

On the other hand, as illustrated in FIG. 25A, as to the light source 202, an angle is adjusted such that light emitted from the light source is reflected by the raindrop 203 (specifically, an interfacial surface between the raindrop 203 and air) attached on an outer surface of the front window 105, and the reflected light is shown in an image region for attached matter detection 214. Therefore, as illustrated in FIG. 25B, an image of the raindrop 203 attached on the outer surface of the front window 105 is appropriately shown in the image region for the attached matter detection 214.

In order to improve detection accuracy of attached matter, it is important to prevent light different from the light emitted from the light source 202 (ambient light) from being incident to the image region for the attached matter detection 214. Therefore, as to the imaging unit of the prior application, an image of the image region for the attached matter detection 214 is imaged via a spectral filter that transmits a wavelength range (for example, an infrared light region) of the light emitted from the light source 202 and cuts a visible light region.

However, in addition to the light emitted from the light source 202, light of the same wavelength (ambient light) as the wavelength of the light emitted from the light source 202 (light source wavelength) is also incident to the image region for attached matter detection 214. In particular, in a case of imaging an image of an imaging region of an external area such as the front region of the vehicle in the image region for vehicle detection 213, various types of light including sunlight are incident to the image region for attached matter detection 214, and intense ambient light having the same wavelength as the light source wavelength is incident to the image region for the attached matter detection 214. The ambient light having such a wavelength is not removed by a spectral filter that cuts a wavelength other than the light source wavelength, and causes a problem that worsens the detection accuracy of the attached matter.

SUMMARY

An object of the present invention is to provide an attached matter detector that improves detection accuracy of the attached matter under a situation where a lot of ambient light (including ambient light of the light source wavelength that is not removed by a spectral filter) is incident to the image region for the attached matter detection, and an in-vehicle device controller using the same.

In order to achieve the above object, an embodiment of the present invention provides: an attached matter detector comprising: a light source that emits light toward a transparent member; an imager that receives transmitted light transmitted through the transparent member from a predetermined imaging region on a light-receiving region for a predetermined imaging region and images an image of the imaging region, and receives reflected light on a predetermined light-receiving region for attached matter detection when light emitted from the light source is reflected by attached matter attached on the transparent member and images an image of the attached matter; a parameter calculator of an image for an attached matter image region that calculates a parameter of an image for an attached matter image region as image information of an image region of the attached matter imaged by the imager; a parameter calculator of an image for an imaging region that calculates a parameter of an image for an imaging region as image information of the imaging region; and an output device of an attached matter state signal that outputs a signal that shows a state of the attached matter based on the calculated parameter of the image for the attached matter image region and the calculated parameter of the image for the imaging region.

BRIEF DESCRIPTION OF THE DRAWINGS

FIG. 22 is a flow diagram illustrating a flow of a determination operation of a state of a front window.

FIG. 23 is a table illustrating criteria for determination of the state of the front window in the determination operation.

FIG. 24 is a table illustrating contents of an instruction operation in accordance with a result of the determination operation of the state of the front window.

FIG. 25A is an explanatory diagram illustrating a light path in which light emitted from a light source is reflected by a raindrop, and incident to an imaging device in an imaging unit of the prior application. FIG. 25B is an example of an image of imaged image data imaged by the imaging unit.

DETAILED DESCRIPTION OF THE PREFERRED EMBODIMENTS

Hereinafter, an attached matter detector, which is used in an in-vehicle device control system as a vehicle system, according to an embodiment of the present invention will be explained.

Note that the attached matter detector according to the embodiment of the present invention is applicable for not only the in-vehicle device control system, but also another system including an object detector that performs object detection based on an imaged image, for example.

Figure 1:
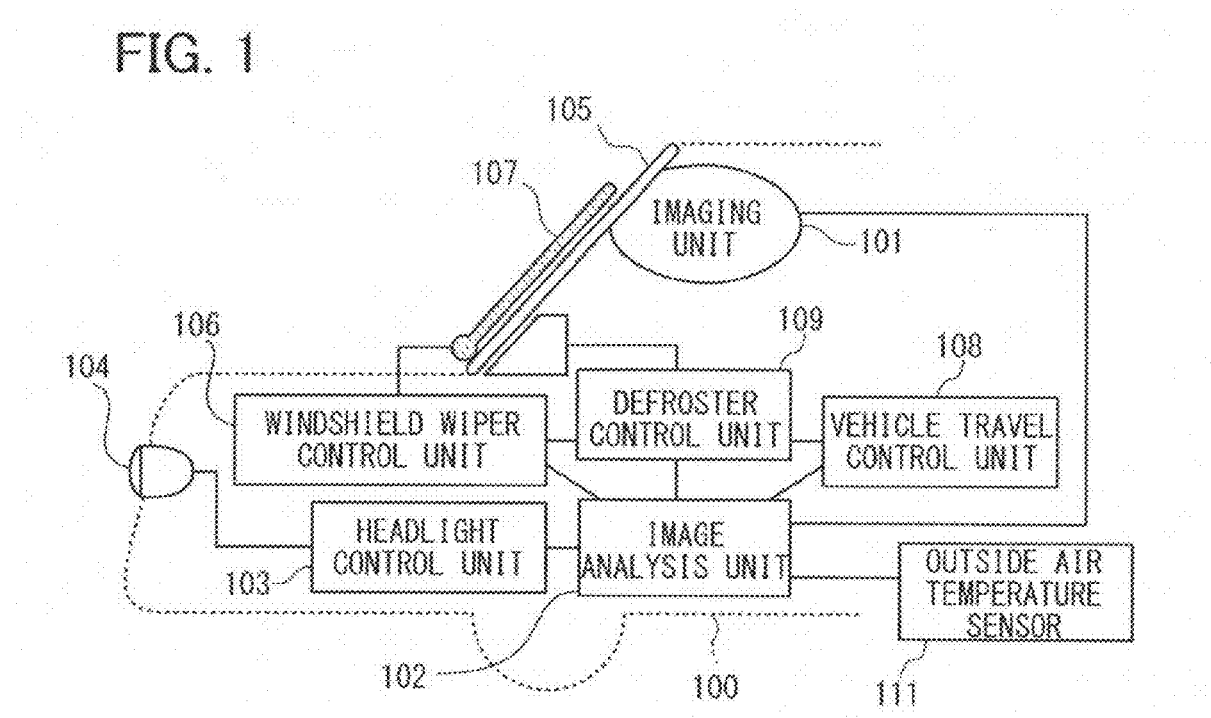
FIG. 1 is a schematic structure diagram of an in-vehicle device control system in the present embodiment.

FIG. 1 is a schematic structure diagram of an in-vehicle device control system according to the embodiment of the present invention.

The in-vehicle device control system, by use of imaged image data of a front region in a travelling direction of a driver's vehicle (imaging region) imaged by an imaging device as an imager included in a driver's vehicle 100, or the like, performs light distribution control of a headlight, drive control of a windshield wiper, control of a defroster, and control of other in-vehicle devices.

The imaging device included in the in-vehicle device control system according to the embodiment is provided in an imaging unit 101, and images a front region in a travelling direction of a driver's vehicle 100 as an imaging region. The imaging device of the imaging unit 101 is placed around a rearview mirror (not illustrated) of a front window 105 of the driver's vehicle 100, for example. Imaged image data imaged by the imaging device of the imaging unit 101 is inputted to an image analysis unit 102. The image analysis unit 102 analyzes imaged image data sent from the imaging device, calculates a position, direction, and distance of another vehicle existing in front of the driver's vehicle 100, detects front window state information such as the presence or absence of a raindrop or foreign matter attached on the front window 105, occurrence of freezing or fogging, and the like, and detects an object to be detected such as a white line in a road-side part and on a road surface (road marking line) that exists in the imaging region. In a case of detection of another vehicle, by identifying a taillight of another vehicle, it is possible to detect a vehicle in front that travels in the same travelling direction as the driver's vehicle 100, and by identifying a headlight of another vehicle, it is possible to detect an oncoming vehicle that travels in a direction opposite to the driver's vehicle 100.

In the driver's vehicle 100 in the present embodiment, an outside air temperature sensor 111 that detects outside air temperature is provided. The image analysis unit 102 performs the various above-described detections by using a detection result of the outside air temperature sensor 111 as necessary. In the present embodiment, as later described, the detection result of the outside air temperature sensor 111 is used in a case of detecting whether the front window 105 is frozen or not.

A calculation result of the image analysis unit 102 is sent to a headlight control unit 103. The headlight control unit 103 generates a control signal that controls a headlight 104, which is an in-vehicle device of the driver's vehicle 100, from distance data calculated by the image analysis unit 102, for example. Specifically, for example, a switching control of high and low beams of the headlight 104, and a partial light blocking control of the headlight 104 are performed such that prevention of dazzling of a driver of another vehicle is performed by preventing intense light of the headlight 104 of the driver's vehicle 100 from being incident to the eyes of the driver of a vehicle in front, or an oncoming vehicle, and security of a field of view of a driver of the driver's vehicle 100 is achieved.

The calculation result of the image analysis unit 102 is also sent to a windshield wiper control unit 106. The windshield wiper control unit 106 controls a windshield wiper 107 to remove attached matter such as a raindrop, foreign matter, or the like attached on the front window 105 of the driver's vehicle 100. The windshield wiper control unit 106 receives a foreign matter detection result detected by the image analysis unit 102, and generates a control signal that controls the windshield wiper 107. When the control signal generated by the windshield wiper control unit 106 is sent to the windshield wiper 107, the windshield wiper 107 is operated so as to secure the field of vision of the driver of the driver's vehicle 100. The windshield wiper control will be explained in detail later.

Additionally, the calculation result of the image analysis unit 102 is also sent to a vehicle travel control unit 108. The vehicle travel control unit 108 informs the driver of the driver's vehicle 100 of a warning, and performs a travel support control such as control of a steering wheel or a brake of the driver's vehicle 100, in a case where the driver's vehicle 100 is out of a lane region marked by a white line, or the like based on a detection result of the white line detected by the image analysis unit 102.

Additionally, based on a detection result of a road sign detected by the image analysis unit 102, the vehicle travel control unit 108 compares road sign information and a vehicle travel state. And, for example, the vehicle travel control unit 108 performs vehicle travel support control to warn a driver of the driver's vehicle 100, when it is determined that travelling speed of the driver's vehicle 100 (vehicle travelling state) is close to a speed limit (road sign information), and to control the brake of the driver's vehicle 100, when it is determined that the travelling speed of the driver's vehicle 100 exceeds the speed limit.

Additionally, the calculation result of the image analysis unit 102 is also sent to a defroster control unit 109. The defroster control unit 109 generates a control signal that controls a defroster 110, based on a detection result of a state of freezing or fogging of the front window 105. The control signal generated by the defroster control unit 109 is sent to the defroster 110, and based on the control signal, the defroster 110 performs an operation to clear the state of freezing or fogging of the front window 105 by blowing or heating the front window 105. The defroster control will be explained in detail later.

Figure 2:
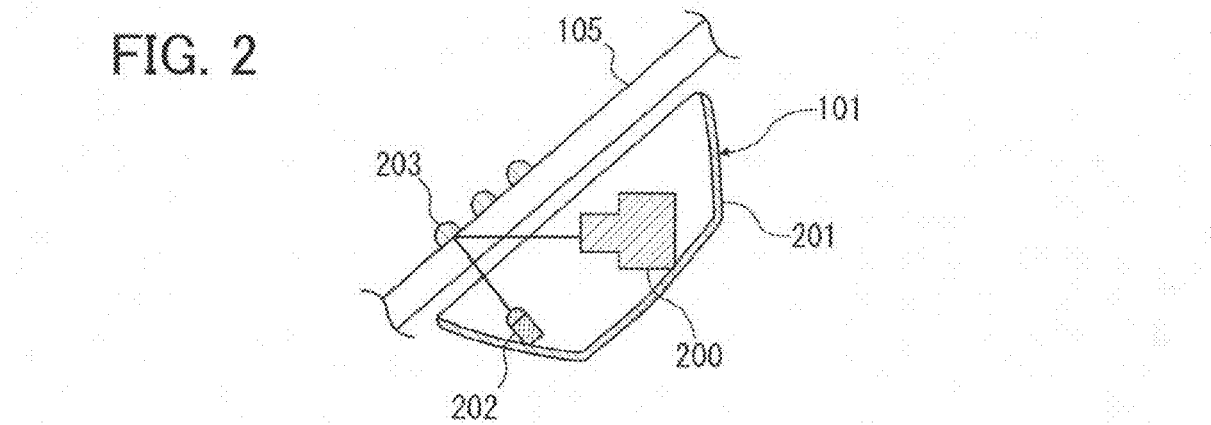
FIG. 2 is a schematic structure diagram of an imaging unit in the in-vehicle device control system.

FIG. 2 is a schematic structure diagram of the imaging unit 101.

Figure 3:
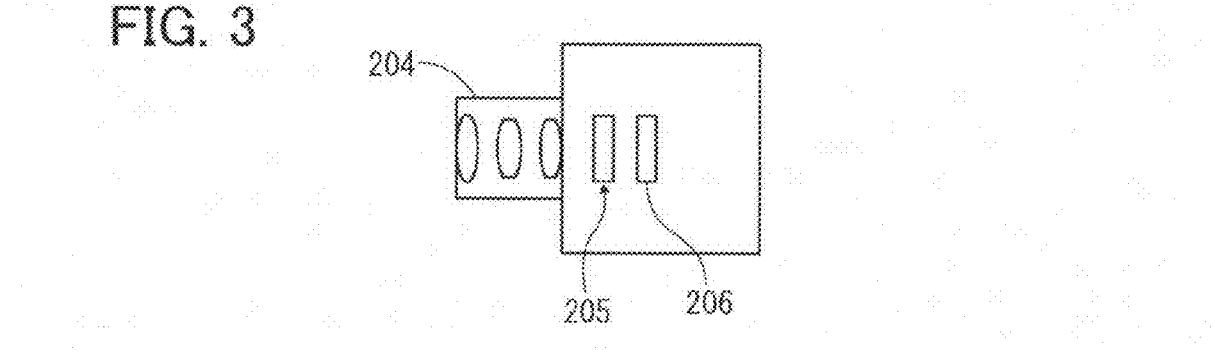
FIG. 3 is an explanatory diagram illustrating a schematic structure of an imaging device included in the imaging unit.

FIG. 3 is a schematic structure diagram of the imaging device 200 included in the imaging unit 101.

The imaging unit 101 includes the imaging device 200, a light source 202, and a casing 201 that stores those described above. The imaging unit 101 is arranged on an inner surface side of the front window 105 of the driver's vehicle 100. The imaging device 200, as illustrated in FIG. 3, includes an imaging lens 204, an optical filter 205, and an image sensor 206. The light source 202 emits light toward the front window 105, and is arranged such that when the light is reflected by a raindrop, a frozen portion, a fogging portion, or the like attached on the front window 105, the reflected light is incident to the imaging device 200.

In the present embodiment, the light source 202 is for detection of attached matter such as a raindrop 206, or the like attached on the outer surface of the front window 105 (hereinafter, a typical example of a case where the attached matter is a raindrop will be mainly explained.). In a case where the raindrop 203 is not attached on the outer surface of the front window 105, the light emitted from the light source 202 is reflected by an interfacial surface between the outer surface of the front window 105 and air, and is transmitted through the outer surface of the front window 105. In the present embodiment, even if the light emitted from the light source 202 is reflected by the interfacial surface between the outer surface of the front window 105 and the air, the light source 202 is configured such that the specular reflected light is not incident to the imaging device 200.

On the other hand, as illustrated in FIG. 2, in a case where the raindrop 203 is attached on the outer surface of the front window 105, a refractive index difference between the outer surface of the front window 105 and the raindrop 203 becomes smaller than that between the outer surface of the front window 105 and the air. Therefore, the light emitted from the light source 202 is transmitted through the interfacial surface between the outer surface of the front window 105 and the raindrop 203, and is incident to the raindrop 203. And then, the light incident to the raindrop 203 is reflected by an interfacial surface between the raindrop 203 and the air. The reflected light by the raindrop 203 is incident to the imaging device 200, after being transmitted through the front window 105.

Due to such a difference of the presence or absence of the raindrop 203, the image analysis unit 102 detects the raindrop 203 attached on the front window 105 from the imaged image data sent from the imaging device 200. Here, the raindrop 203 is explained as a typical example; however, as to attached matter of smudges (opaque objects) such as droppings of birds, and the like other than the raindrop, reflected light by an interfacial surface between the front window 105 and the smudges is detected. Additionally, a fogging portion on the inner surface or outer surface of the front window 105 is taken as a state where minute waterdrops are attached. A frozen portion on the front window 105 is taken as a state where a transparent reflection surface having a slight difference in height is formed.

Additionally, in the present embodiment, as illustrated in FIG. 2, the imaging device 200 and the light source 202 of the imaging unit 101 are covered by the casing 201 with the front window 105. Thus, by being covered by the casing 201, even if the inner surface of the front window 105 is fogging, it is possible to suppress a state where the front window 105 covered by the imaging unit 101 is fogging. Therefore, it is possible to suppress a state where the image analysis unit 102 mistakenly performs analysis due to the fogging on the front window 105, and appropriately performs various control operations based on an analysis result of the image analysis unit 102.

However, in the present embodiment, since the fogging on the front window 105 is detected from the imaged image data by the imaging device 200, and, for example, the defroster control of the driver's vehicle 100 is performed, a path through which the air flows may be formed in a part of the casing 201 such that a part of the front window 105 facing the imaging device 200 becomes the same state as other parts.

Here, in the present embodiment, a focus position of the imaging lens 204 is set to infinity, or between infinity and the front window 105. Therefore, not only in a case of performing detection of the raindrop, or the like attached on the front window 105, but also in a case of performing detection of a vehicle in front, or an oncoming vehicle, or detection of a white line, is it possible to obtain appropriate information from the imaged image data by the imaging device 200.

For example, in a case of performing the detection of the raindrop 203 attached on the front window 105, since a shape of an image of the raindrop 203 in the imaged image data is often a round shape, a shape identification operation is performed which determines whether a raindrop candidate image in the imaged image data is in a round shape, and the raindrop candidate image is identified as the image of the raindrop. In a case of performing such a shape identification operation, there is a case where the imaging lens 204 is in focus on infinity or between infinity and the front window 105 as described above is slightly out of focus compared with a case where the imaging lens 204 is in focus on the raindrop 203 on the outer surface of the front window 105, which makes a shape identification rate of the raindrop (round shape) higher, and a raindrop detection performance is high.

Figure 4:
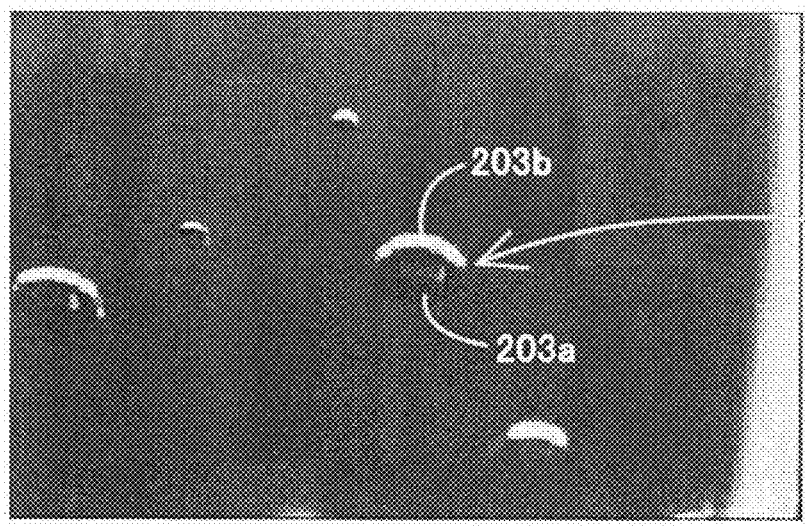
FIG. 4 is an explanatory diagram illustrating infrared light image data as imaged image data for attached matter detection, in a case where an imaging lens focuses on a raindrop on an outer surface of a front window of a driver's vehicle.

FIG. 4 is an explanatory diagram illustrating infrared light image data as imaged image data for attached matter detection in a case where the imaging lens 204 focuses on the raindrop 203 on the outer surface of the front window 105.

Figure 5:
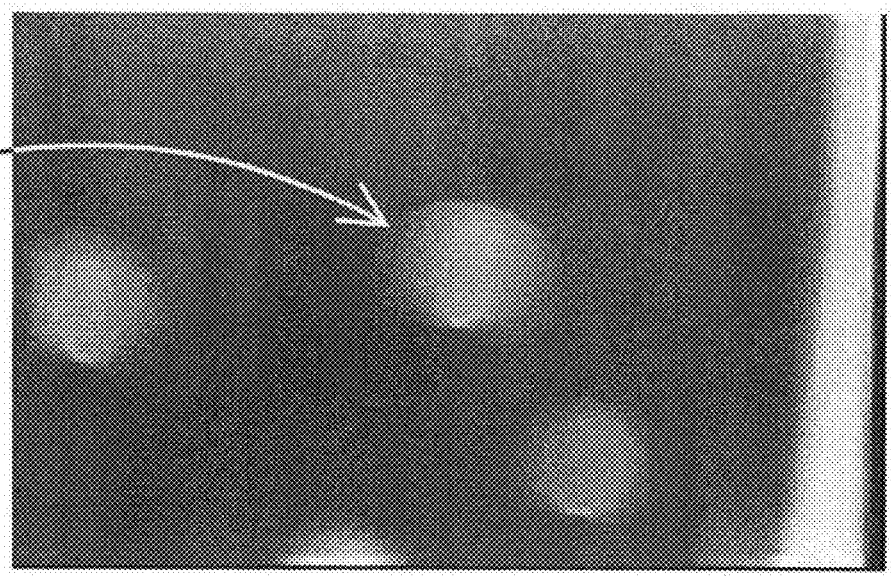
FIG. 5 is an explanatory diagram illustrating infrared light image data as imaged image data for attached matter detection, in a case where an imaging lens focuses on infinity.

FIG. 5 is an explanatory diagram illustrating infrared light image data as imaged image data for attached matter detection, in a case where the imaging lens 204 focuses on infinity.

In a case where the imaging lens 204 focuses on the raindrop 203 on the outer surface of the front window 105, as illustrated in FIG. 4, a background image 203a shown in the raindrop 203 is imaged. Such a background image 203a causes false detection of the raindrop 203. Additionally, as illustrated in FIG. 4, there is a case where brightness is high in an arch-shaped manner only in a part 203b of the raindrop 203, and a shape of the high brightness part, that is, a shape of an image of the raindrop changes depending on a direction of sunlight, a position of a street lamp, and the like. An operation load is large in order to treat the shape of the image of the raindrop that changes in such a different manner with the shape identification operation, and accuracy in identification decreases.

On the other hand, in a case where the imaging lens 204 focuses on infinity, as illustrated in FIG. 5, there is the occurrence of a slight out-of-focus. Therefore, the background image 203a shown in the raindrop 203 is not reflected in the imaged image data, and the false detection of the raindrop 203 is reduced. Additionally, due to the occurrence of a slight out-of-focus, a degree of change in the shape of the image of the raindrop becomes small by the direction of the sunlight, the position of the street lamp, and so on, and the shape of the image of the raindrop becomes always an approximately round shape. Therefore, the operation load of the shape identification operation of the raindrop 203 is small, and the accuracy in identification increases.

However, in the case where the imaging lens 204 focuses on infinity, when identifying a taillight of a vehicle in front travelling in the distance, there is a case where the number of light-receiving elements that receive light of the taillight on the image sensor 206 is approximately one. Details will be described later; however, in this case, there is a risk that the light of the taillight is not received by a red color light-receiving element that receives a color of the taillight (red color), and therefore, in such a case, the taillight is not identified, and the vehicle in front is not detected. In a case of avoiding such a risk, it is preferable to focus the imaging lens 204 on a side nearer than infinity. Thus, since the taillight of the vehicle in front travelling in the distance is out of focus, it is possible to increase the number of light-receiving elements that receive the light of the taillight, and the accuracy in identification of the taillight increases, and accuracy in detection of the vehicle in front improves.

A light-emitting diode (LED), a laser diode (LD), or the like can be used for the light source 202 of the imaging unit 101. Additionally, as an emission wavelength of the light source 202, for example, visible light, or infrared light can be used. However, in a case of preventing a driver of an oncoming vehicle, a pedestrian, or the like from being dazzled by the light of the light source 202, it is preferable to select a wavelength that is longer than the visible light, and in a range of a light-receiving sensitivity of the image sensor 206, for example, a wavelength of an infrared light region that is equal to or more than 800 nm and less than or equal to 1000 nm. The light source 202 of the present embodiment emits light having the wavelength of the infrared light region.

Here, in a case of imaging infrared wavelength light emitted from the light source 202 and reflected by the attached matter on the front window 105 by the imaging device 200, the image sensor 206 of the imaging device 200 also receives a large amount of ambient light including infrared wavelength light such as sunlight, or the like, for example, in addition to the infrared wavelength light emitted from the light source 202. Therefore, in order to identify the infrared wavelength light emitted from the light source 202 from such a large amount of ambient light, it is necessary to sufficiently increase a light emission amount of the light source 202 compared with the ambient light. However, there are many cases where it is difficult to use a light source 202 having such a large emission amount of light.

Figure 6:
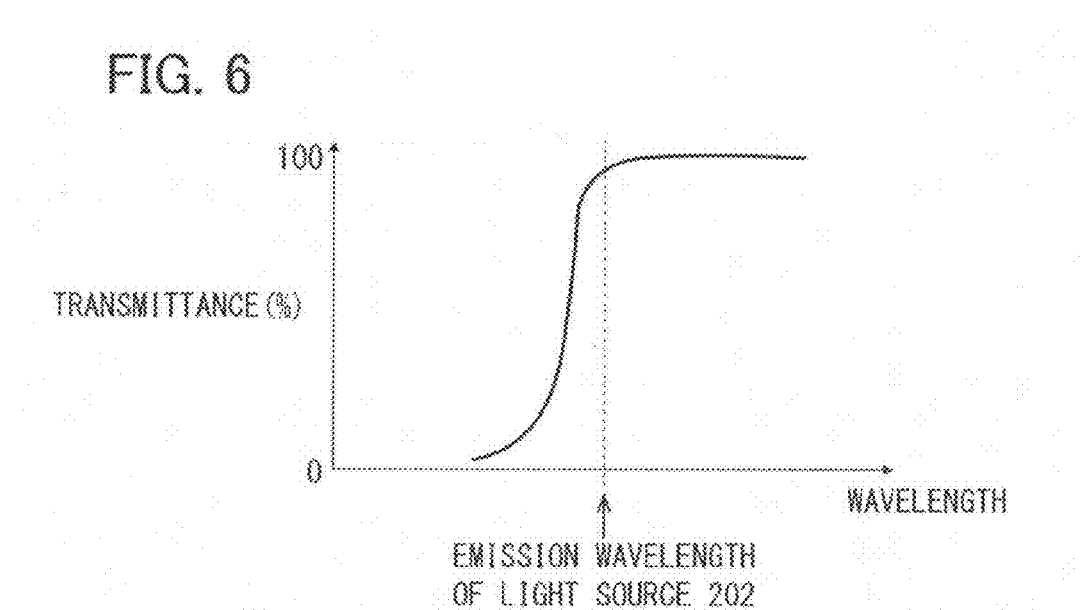
FIG. 6 is a graph illustrating a filter characteristic of a cut filter that is applicable for imaged image data for attached matter detection.
Figure 7:
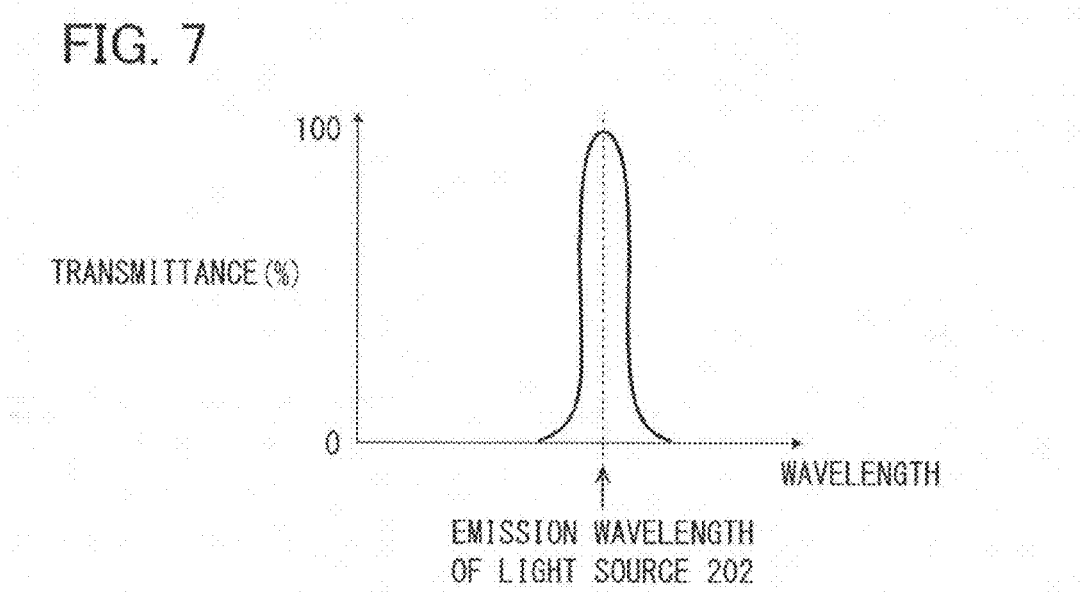
FIG. 7 is a graph illustrating a filter characteristic that is applicable for imaged image data for attached matter detection.

Accordingly, the present embodiment is structured such that the image sensor 206 receives the light emitted from the light source 202, for example, via a cut filter so as to cut light of shorter wavelength than an emission wavelength of the light source 202 as illustrated in FIG. 6, or via a bandpass filter where a peak of transmittance approximately corresponds to the emission wavelength of the light source 202 as illustrated in FIG. 7. Thus, it is possible to receive the light emitted from the light source 202 to remove light other than the emission wavelength of the light source 202, and therefore, an amount of light emitted from the light source 202 and received by the image sensor 206 relatively increases with respect to the ambient light. As a result, it is possible to identify the light emitted from the light source 202 from the ambient light, without using the light source 202 of the large emission amount of light.

However, in the present embodiment, from the imaged image data, not only the detection of the raindrop 203 on the front window 105, but also the detection of the vehicle in front, or the oncoming vehicle, the detection of the white line, and the like are performed. Therefore, if a wavelength range other than the infrared wavelength light emitted from the light source 202 is removed from an entire imaged image, it is not possible to receive light in a wavelength range that is necessary to perform the detection of the vehicle in front, or the oncoming vehicle, and the detection of the white line, which interferes with those detections. Accordingly, in the present embodiment, an image region of the imaged image data is divided into an image region for raindrop detection to detect the raindrop 203 on the front window 105, and an image region for vehicle detection to perform the detection of the vehicle in front, or the oncoming vehicle, and the detection of the white line, and a filter that removes the wavelength range other than the infrared wavelength light emitted from the light source 202 only from a part corresponding to the image region for the raindrop detection is arranged at the optical filter 205.

Figure 8:
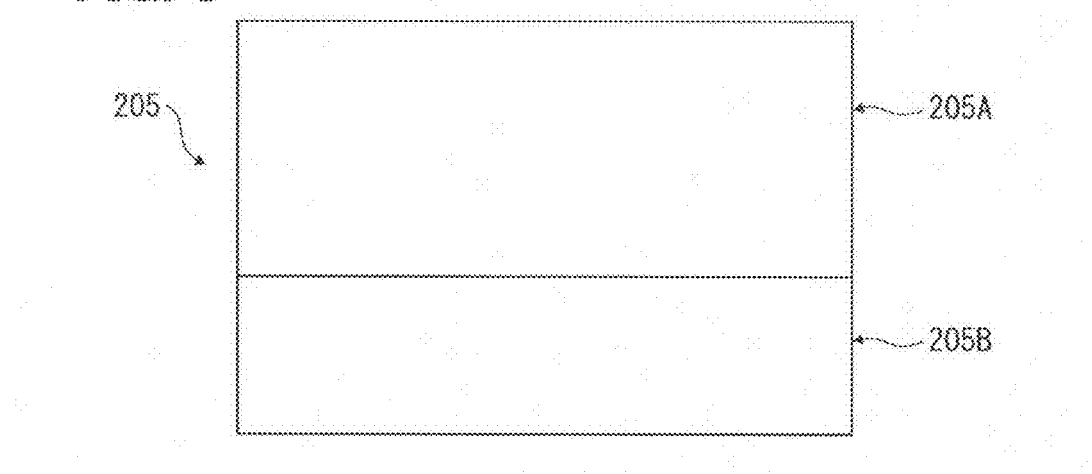
FIG. 8 is a front diagram of an optical filter, which is divided into a filter region corresponding to an image region for vehicle detection and a filter region corresponding to an image region for attached matter detection, of the imaging device.

FIG. 8 is a front view of the optical filter 205, which is divided into a filter region corresponding to an image region for vehicle detection and a filter region corresponding to an image region for attached matter detection.

Figure 9:
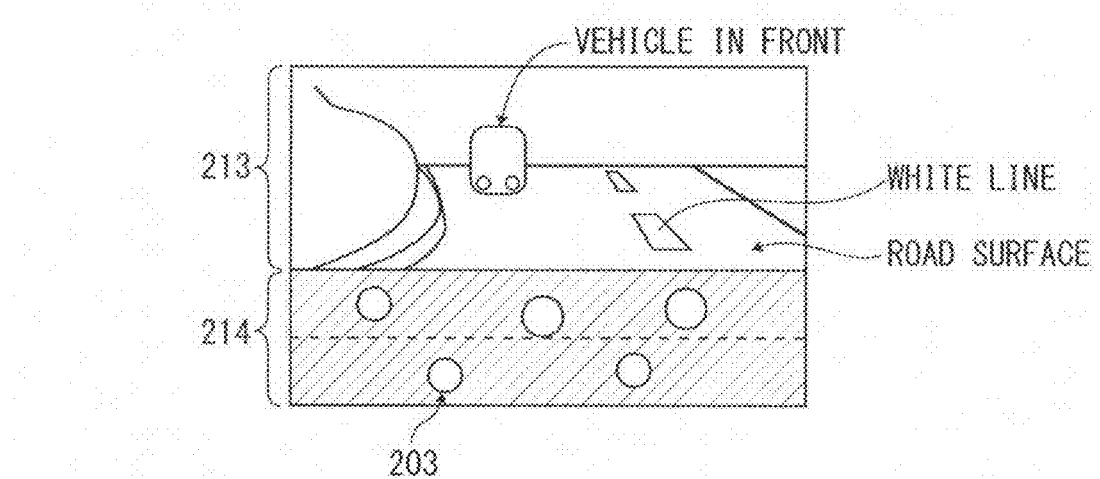
FIG. 9 is an explanatory diagram illustrating an example of an image of imaged image data by the imaging device.

FIG. 9 is an explanatory diagram illustrating an example of an image of imaged image data.

As illustrated in FIG. 9, an image region for vehicle detection 213 corresponds to a part corresponding to an upper part, ⅔ of the imaged image, and an image region for raindrop detection 214 corresponds to a part corresponding to a lower part, ⅓ of the imaged image. Images in the imaging region (front region of the driver's vehicle) such as a headlight of an oncoming vehicle, a taillight of a vehicle in front, a white line, and a road sign often exist in the upper part of the imaged image, and in the lower part of the imaged image, images of a nearest road surface in front of the driver's vehicle 100 and a hood of the driver's vehicle 100 normally exist. Therefore, necessary information for identification of the headlight of the oncoming vehicle, the taillight of the vehicle in front, and the white line is concentrated in the upper part of the imaged image, and the lower part of the imaged image is not so important for the identification of those. Therefore, in a case where both the detection of the oncoming vehicle, the vehicle in front, the white line, and the road sign and the detection of the raindrop are performed from single imaged image data, as illustrated in FIG. 9, the lower part of the imaged image is taken as the image region for raindrop detection 214, and the rest, the upper part, of the imaged image is taken as the image region for vehicle detection 213, and it is preferable to divide the optical filter 205 into regions corresponding to the above.

When inclining an imaging direction of the imaging device 200 downward, there is a case where the hood of the driver's vehicle 100 is captured in the lower part of the imaging region. In this case, sunlight reflected by the hood of the driver's vehicle 100, the taillight of the vehicle in front, or the like becomes ambient light, which is included in the imaged image data, and becomes a cause of misidentification of the headlight of the oncoming vehicle, the taillight of the vehicle in front, and the white line. Even in such a case, in the present embodiment, in the part corresponding to the lower part of the imaged image, the cut filter illustrated in FIG. 6, or the band-pass filter illustrated in FIG. 7 is arranged, and therefore the ambient light such as the sunlight reflected by the hood, the taillight of the vehicle in front, or the like is removed. Accordingly, the accuracy in identification of the headlight of the oncoming vehicle, the taillight of the vehicle in front, and the white line is improved.

The optical filter 205 includes a filter part for vehicle detection 205A corresponding to the image region for vehicle detection 213, and a filter part for attached matter detection 205B corresponding to the image region for attached matter detection 214, layer structures of which are different. In particular, the filter part for vehicle detection 205A does not include a spectral filter layer 211, and the filter part for attached matter detection 205B includes a spectral filter layer 211. Note that in the present embodiment, due to the characteristic of the imaging lens 204, positions in the vertical direction of a view in the imaging region and an image on the image sensor 206 are reversed. Therefore, in a case where the lower part of the imaged image is taken as the image region for attached matter detection 214, the filter part for attached matter detection 205B constitutes the upper part of the optical filter 205.

Here, in a case of detecting a car in front, the detection of the vehicle in front is performed by identifying a taillight of the vehicle in front in the imaged image. However, a light amount of the taillight is smaller than that of a headlight of an oncoming vehicle, and lots of ambient light such as a street lamp, and the like exists, and therefore, it is difficult to detect the taillight accurately only from mere brightness data. In such a case where spectral information is used for the identification of the taillight to identify the taillight based on a received-light amount of red light, it is possible to improve the accuracy in identification of the taillight. Therefore, as the optical filter 205, a red-color filter corresponding to a color of the taillight, or a cyan filter (a filter that transmits only a wavelength range of the color of the taillight) is arranged so as to detect the received-light amount of the red light Since each light-receiving element constituting the image sensor 206 in the present embodiment also has sensitivity to the infrared wavelength light, if the image sensor 206 receives light including the infrared wavelength light, an obtained imaged image becomes an entirely reddish one. As a result, there is a case where it is difficult to identify a red color part of an image corresponding to the taillight. Therefore, as the optical filter 205 in the present embodiment, as described later, a spectral filter layer 223 that cuts light from a visible light range from a light source wavelength range is used.

Figure 10:
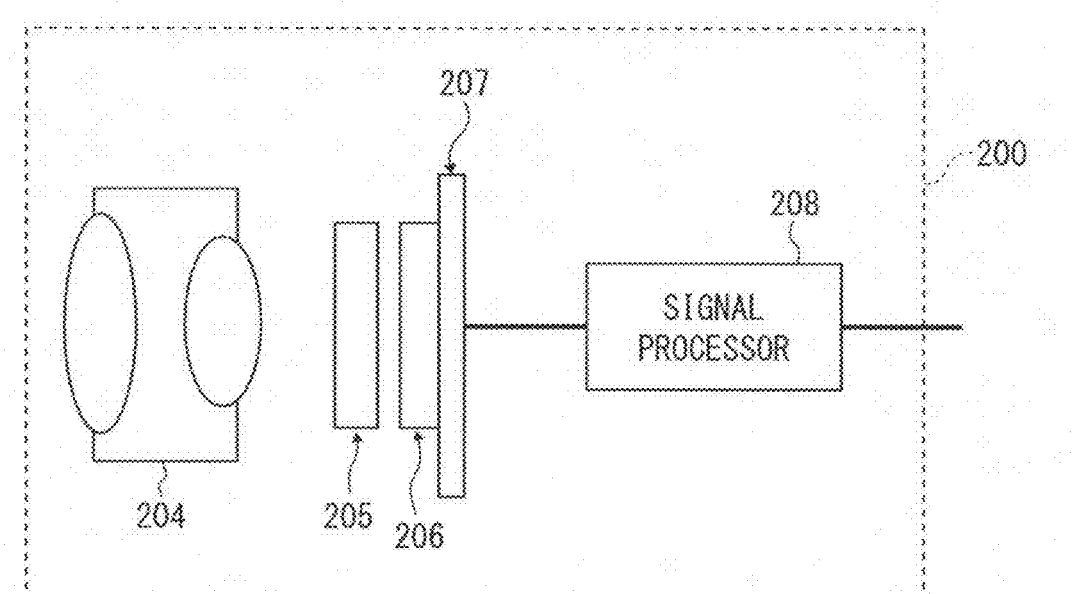
FIG. 10 is an explanatory diagram illustrating the imaging device in detail.

FIG. 10 is an explanatory diagram illustrating the imaging device 200 in detail.

The imaging device 200 mainly includes the imaging lens 204, the optical filter 205, a sensor substrate 207 including the image sensor 206 having an pixel array two-dimensionally arranged, and a signal processor 208 that generates and outputs imaged image data in which an analog electric signal outputted from the sensor substrate 207 (received-light amount received by each light-receiving element on the image sensor 206) is converted to a digital electric signal. Light from the imaging region including a photographic subject (object to be detected) passes through the imaging lens 204, is transmitted through the optical filter 205, and is converted to an electric signal in accordance with intensity of the light by the image sensor 206. When the electric signal (analog signal) outputted from the image sensor 206 is inputted to the signal processor 208, from the electric signal, the signal processor 208 outputs a digital signal representing brightness of each pixel on the image sensor 206 as the imaged image data with horizontal and vertical synchronization signals of the image to the following unit.

Figure 11:
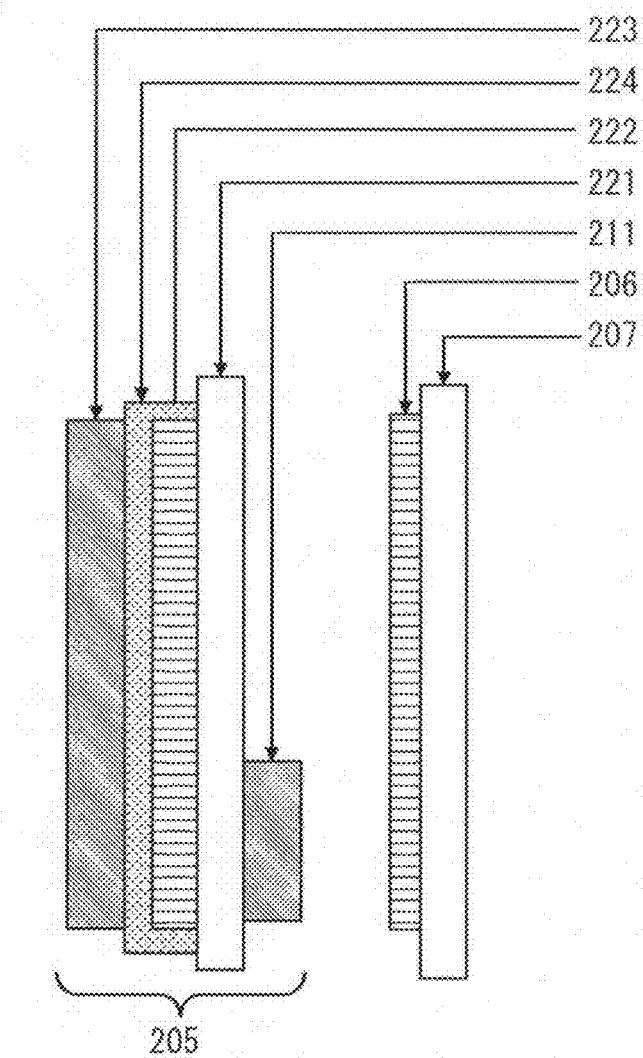
FIG. 11 is an enlarged schematic diagram of the optical filter and an image sensor of the imaging device when viewed from a direction perpendicular to a light transmission direction.

FIG. 11 is an enlarged schematic diagram of the optical filter 205 and the image sensor 206 when viewed from a direction perpendicular to a light transmission direction.

Figure 12:
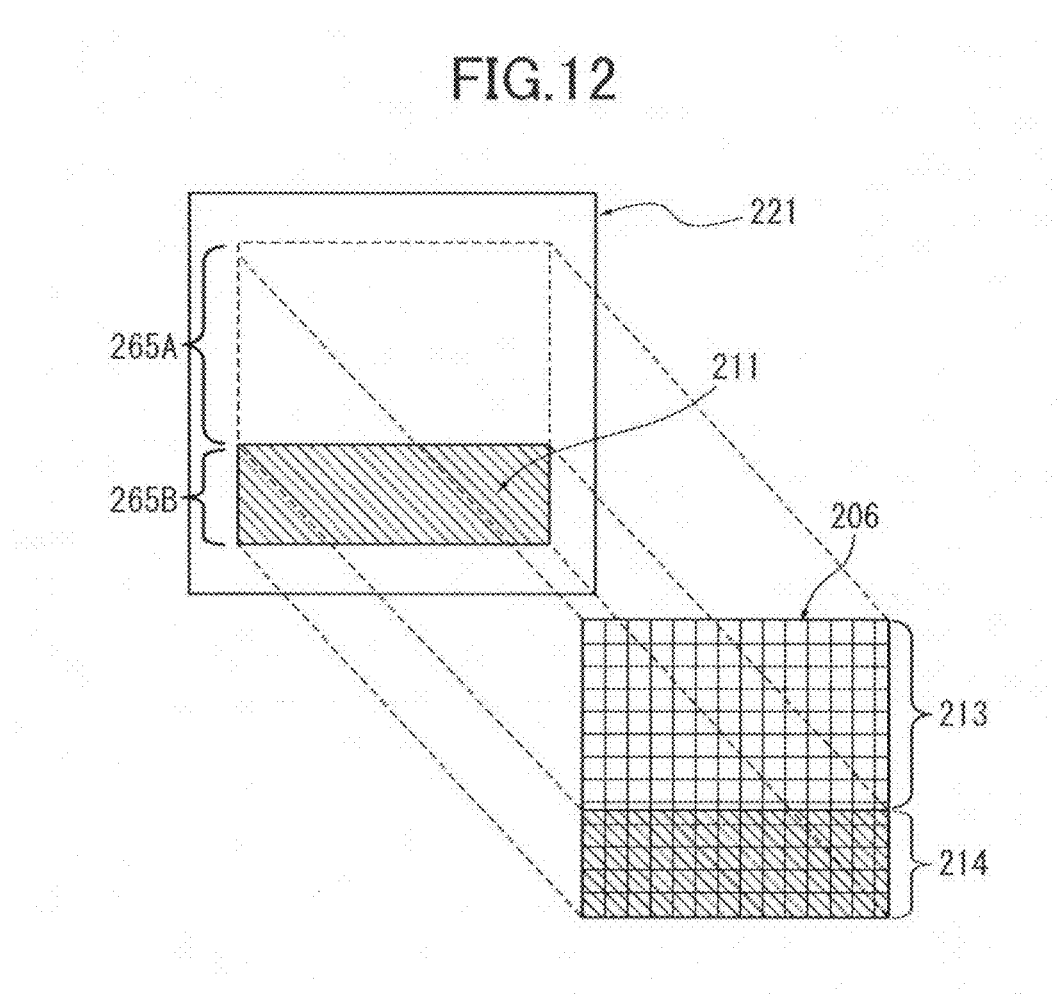
FIG. 12 is an explanatory diagram illustrating a correspondence relationship between a filter part for vehicle detection and a filter part for attached matter detection of the optical filter corresponding to an image region for vehicle detection and an image region for attached matter detection on an image sensor, respectively.

FIG. 12 is an explanatory diagram illustrating a correspondence relationship between the filter part for vehicle detection 205A and the filter part for attached matter detection 205B of the optical filter 205 corresponding to the image region for vehicle detection 213 and the image region for attached matter detection 214 on the image sensor 214, respectively.

The image sensor 206 is an image sensor using a CCD (Charge-Coupled Device), a CMOS (Complementary Metal- Oxide Semiconductor), or the like, and as a light-receiving element of which, a photodiode 206A is used. The photodiode 206A is two-dimensionally arranged in an array manner per pixel, and in order to increase a light collection efficiency of the photodiode 206A, a micro lens 206B can be provided on an incident side of each photodiode 206A. The image sensor 206 is connected on a PWB (Printed Wiring Board) by a wire bonding method, or the like, and the sensor substrate 207 is formed.

On a light-receiving surface of the image sensor 206, the optical filter 205 is closely arranged. As illustrated in FIG. 11, the optical filter 205 has a layer structure in which a spectral filter layer 211 is formed on one surface of a transparent filter substrate 221 (surface facing the light-receiving surface of the image sensor 206), and a polarization filter layer 222 and a spectral filter layer 223 are sequentially formed on the other surface of the transparent filter substrate 221. The optical filter 205 and the image sensor 206, for example, can be bonded with a UV adhesive agent, or a quadrilateral region outside of an effective pixel range using imaging can be bonded by a UV adhesion or a thermal compression bonding in a state of being supported by a spacer outside of the effective pixel range.

Here, the optical filter 205 in the present embodiment will be further explained.

The filter substrate 221 of the optical filter 205 can be formed by a material that transmits light in a used wavelength range (in the present embodiment, a visible light region and an infrared light region) and is transparent, such as glass, sapphire, crystal, and so on, for example. In the present embodiment, it is preferable to use glass, in particular, such as quartz glass (refractive index 1.46), which is cheap and durable, or tempax glass (refractive index 1.51).

Figure 13:
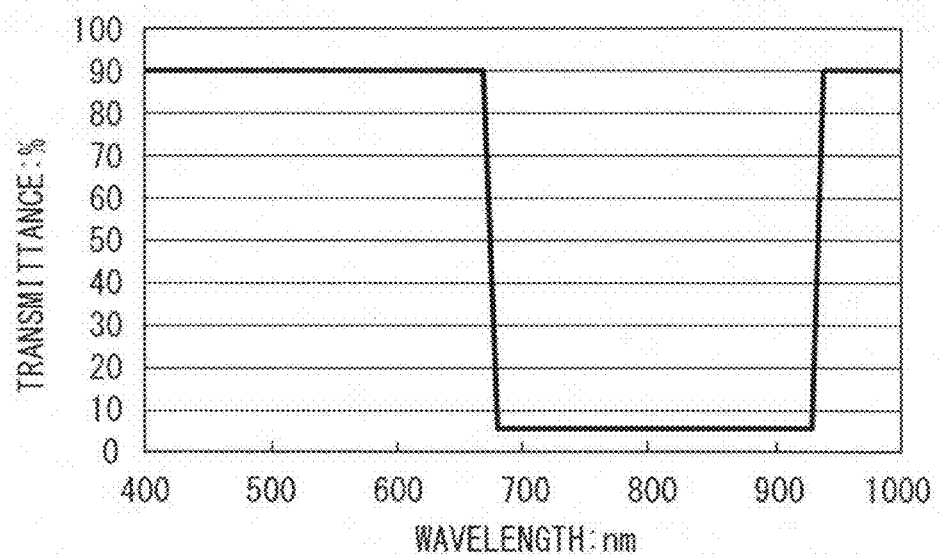
FIG. 13 is a graph illustrating a transmittance characteristic of a first spectral filter layer included in the optical filter.

The spectral filter layer 223 of the optical filter 205 has a transmittance characteristic as illustrated in FIG. 13. That is, the spectral filter layer 223 transmits incident light in the visible light region, a wavelength range of which is equal to or more than 400 nm and less than or equal to 670 nm, and incident light in the infrared light region, a wavelength range of which is equal to or more than 940 nm and less than or equal to 970 nm, and cuts incident light, a wavelength range of which is longer than 670 nm and less than 940 nm. Transmittance in the wavelength range that is equal to or more than 400 nm and less than or equal to 670 nm, and in the wavelength range that is equal to or more than 940 nm and less than or equal to 970 nm is preferable to be equal to or more than 30%, and is further preferable to be equal to or more than 90%. Transmittance in the wave length range that is longer than 670 nm and less than 940 nm is preferable to be less than or equal to 20%, and is further preferable to be less than or equal to 5%.

The incident light in the visible light region is used for detection of a vehicle, a white line, and the like in the image region for vehicle detection 213, and the incident light in the infrared light region is used for detection of attached matter such as a raindrop and the like on a front window in the image region for attached matter detection 214. The reason why incident light, a wavelength range of which is longer than 670 nm and less than 940 nm, is not transmitted is that in a case where light in this wavelength range is captured, obtained image data becomes an entirely reddish one, and there is a case where it is difficult to extract a part representing a taillight, or a red road sign, or the like. In the present embodiment, since the spectral filter layer 223 cuts the incident light, the wavelength range of which is longer than 670 nm and less than 940 nm, it is possible to improve the accuracy in identification of the taillight, and the accuracy in identification of red road signs including a stop sign, or the like in Japan. Note that a wavelength range of 940 nm-970 nm, and a wavelength range of 400 nm-670 nm are typical examples of the wavelength range according to the embodiment of the present invention.

The spectral filter layer 223 is made by a multi-layer film structure in which a thin film of a high refractive index and a thin film of a low refractive index are alternately layered. With such a multi-layer film structure, by using interference of light, the degree of freedom of transmittance setting is high, and thin films are multi-layered, and therefore, it is possible to achieve approximately 100% reflectance to a specific wavelength (for example, a wavelength other than the infrared light).

The polarization filter layer 222 of the optical filter 205 is provided to reduce noise by unnecessary reflected light. A part of light emitted from the light source 202 is transmitted through the inner surface and the outer surface of the front window 105; however, the rest of the light emitted from the light source 202 is reflected, and when the reflected light is incident to the imaging device 200, it becomes ambient light. In such ambient light, a polarization component (horizontal polarization component) that is vertical to a plane (in the present embodiment, vertical plane) formed by two optical axes of an optical axis of light emitted toward the front window 105 from the light source 202 and an optical axis of the imaging lens 204 is intense. Therefore, the polarization filter layer 222 includes a polarization filter that cuts the horizontal polarization component, and selectively transmits only a polarization component (vertical polarization component) parallel to the vertical plane. Additionally, such a polarization filter is effective for reduction of noise caused by light transmitted through the front window 105 from outside that is reflected by a cover in the vehicle, for example, a surface of a dashboard, or the like.

Figure 14:
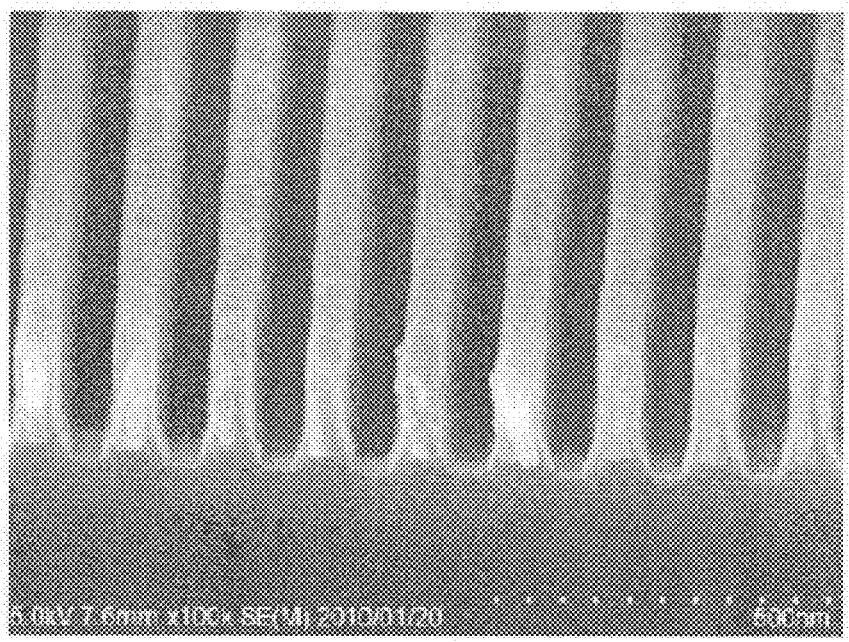
FIG. 14 is an enlarged explanatory diagram illustrating a wire grid polarizer of a polarization filter layer included in the optical filter.

The polarization filter layer 222 can be formed by a wire-grid polarizer as illustrated in FIG. 14. Conductor lines made of metal such as aluminum that are arranged in a grid-like pattern at a specific pitch constitute the wire-grid polarizer. If the pitch is smaller than (for example, less than or equal to one-half of) a wavelength of incident light (for example, a visible light wavelength), light of an electric field vector component that oscillates parallel to a conductor line is mostly reflected, and light of an electric field vector component that oscillates vertical to a conductor line is mostly transmitted, and therefore, the wire-grid polarizer can be used as a polarizer that makes single-polarization.

Note that as for the wire-grid polarizer, when a cross-sectional area of a metal wire increases, an extinction ratio increases, and in a case of a metal wire that is larger than a specific width with respect to a period width, transmittance decreases. In addition, when a cross-sectional shape perpendicular to a longitudinal direction of the metal wire is in a tapered shape, in a wide range, wavelength dispersion of transmittance and a polarization degree is small, and a characteristic of a high extension ratio is shown.

In addition, as for a structure of a wire gird, a convexo-concave structure of a sub-wavelength of the wire grid can be formed by a method of a well-known semiconductor process, that is, a metal etching method in which after evaporating an aluminum thin film, patterning is performed, or the like. Therefore, it is possible to adjust a direction of the polarizer to a size equivalent to a pixel size of an imaging element.

The wire-grid polarizer is made of metal such as aluminum, or the like, and therefore, it has excellent heat resistance, and is a suitable polarizer for in-vehicle usage.

Between the filter substrate 221 and the polarization filter layer 222, and in a gap between convex portions of the wire grid, a filler layer 224 is formed by filling an inorganic material that has a lower or an equal refractive index compared with that of the filter substrate 221. As a forming material of the filler layer 224, in order not to deteriorate a polarization characteristic of the polarization filter layer 222, it is preferable to be a material having a low refractive index that is extremely close to a refractive index of air. For example, it is preferable to be a porous ceramic material, which is formed such that microscopic holes are dispersed in ceramics, such as a porous silica ($SiO_2$), a porous magnesium fluoride (MgF), a porous alumina ($Al_2O_3$), or the like. The degree of their refractive index is determined by the number of holes, size (porous degree) in the ceramics. Among them, in a case where a silica crystal or glass is used as a main component on the filter substrate 221 in particular, a porous silica (n=1.22-1.26) is preferable, because the refractive index becomes smaller than that of the filter substrate 221.

As a forming method of the filler layer 224, a spin-on glass (SOG) formulation in which an inorganic coating film is formed can be used. That is, the filler layer 224 is formed such that a solvent in which a silanol ($Si(OH)_4$) is dissolved in alcohol is applied on the filter substrate 221 by spin coating, a solvent component is volatilized by heat treating, and dehydration polymerization reaction occurs on the silanol itself.

Since the polarization filter layer 222 is a wire-grid structure of a subwavelength size, the polarization filter layer 222 is weak in strength compared with the spectral filter layer 223 formed on the filler layer 224. In the present embodiment, since the polarization filter layer 222 that is weak in strength is protected by covering with the filler layer 224, it is possible to protect the wire-grid structure of the polarization filter layer 222 when the optical filter 205 is mounted. In addition, by providing the filler layer 224, it is possible to suppress entry of foreign matter to the wire-grid structure of the polarization filter layer 222.

The height of the convex portion of the wire-grid structure of the polarization filter 222, generally, is set to less than or equal to one-half of a used wavelength. On the other hand, as for the spectral filter layer 223, the height becomes equal to the height of the used wavelength or several times higher, and the transmittance characteristic in a cutoff wavelength can be precipitous, as the thickness increases. And as the thickness of the filler layer 224 increases, it is difficult to secure flatness of an upper surface of the filler layer 224, and due to reasons of damaging homogeneity of a filler area, and the like, it is not appropriate to increase the thickness. In the present embodiment, since the spectral filter layer 223 is formed after covering the polarization filter layer 222 with the filler layer 224, it is possible to stably form the filler layer 224. Additionally, it is also possible to form the spectral filter layer 223 formed on the filler layer 224 so as to optimize its characteristic.

In the present embodiment, the spectral filter layer 223, the filler layer 224, and the polarization filter layer 222 are arranged on a side of the imaging lens 204 with respect to the filter substrate 221. Generally, it is important to suppress defects in a production process of those layers; however, an allowable upper limit of a defect size increases, as those layers separate from the image sensor 206. Note that the filter substrate 221 is used in a range of the thickness of equal to or more than 0.5 mm and less than or equal to 1 mm. According to the present embodiment, it is possible to simplify a production process, and reduce cost, compared with a case of providing those layers on the side of the image sensor 206

Figure 15:
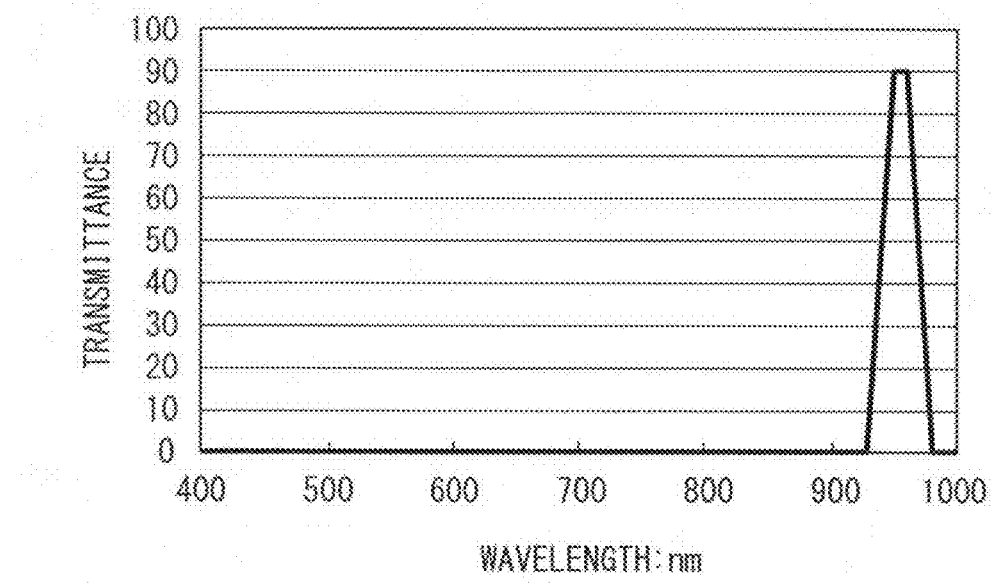
FIG. 15 is a graph illustrating a transmittance characteristic of a second spectral filter layer included in the optical filter.

In addition, in the present embodiment, on the side of the image sensor 206 with respect to the filter substrate 221, the spectral filter layer 211 is formed. The spectral filter layer 211 is formed in the filter part for attached matter detection 205B, and is not formed in the filter part for vehicle detection 205A. As described above, when directly detecting infrared wavelength light reflected by a liquid drop or a frozen portion on the front window 105, there is a problem in that as for the light source 202 that emits infrared wavelength light, the light emitted from the light source 202 has to be brighter than ambient light having enormous amounts of light, for example, sunlight, or the like. Therefore, in the present embodiment, the spectral filter layer 211 of a filter that cuts light of a shorter wavelength than the emission wavelength of the light source 202, or a bandpass filter in which a peak of transmittance almost corresponds to the emission wavelength of the light source 202 is provided in the filter part for attached matter detection 205B. In the spectral filter layer 211 in the present embodiment, as illustrated in FIG. 15, a bandpass filter in which the peak of transmittance almost corresponds to the emission wavelength of the light source 202 is employed. Thus, ambient light other than the emission wavelength of the light source 202 is removed, and it is possible to relatively increase a detected amount of light of the light source 202.

The optical filter 205 in the present embodiment includes two spectral filter layers 211, 223, and each of the spectral filter layers 211, 223 is formed on each surface of the filter substrate 221, respectively. Therefore, it is possible to suppress warping of the optical filter 205. If a multi-layer film is formed only on one surface of the filter substrate 221, warping occurs due to stress. However, in a case of forming multi-layer films on both surfaces of the filter substrate 221, respectively, as in the present embodiment, an effect of the stress is offset, and therefore, it is possible to suppress warping.

The spectral filter layer 211 is made by a multi-layer film structure. The multi-layer structure means a wavelength filter in which thin films of a high refractive index and a low refractive index are alternately multi-layered. It is possible to freely set spectral transmittance by using interference of light, and it is also possible to obtain almost 100% reflectance with respect to a specific wavelength by multi-layering thin films. Note that a mask is provided, when evaporating a multi-layer film, and evaporation coating is performed with masking a part of the filter part for vehicle detection 205A, and therefore, it is possible to form the spectral filter layer 211 in the filter part for attached matter detection 205B so as not to form the spectral filter layer 211 in the filter part for vehicle detection 205A.

In the present embodiment, since the multi-layer film structure is employed for each of the spectral filter layers 211, 223, it is possible to obtain an arbitrary spectral brightness characteristic. Generally, a color filter used for a color sensor, or the like is formed by a resist material; however, with such a resist material, it is difficult to control the spectral brightness characteristic compared with the multi-layer film. The present embodiment enables transmission wavelength ranges of the spectral filter layers 211, 223 to approximately correspond to the wavelength range of the light source 202 by using the multi-layer film structure Next, a detection operation of a state of a front window in the present embodiment will be explained.

Figure 16:
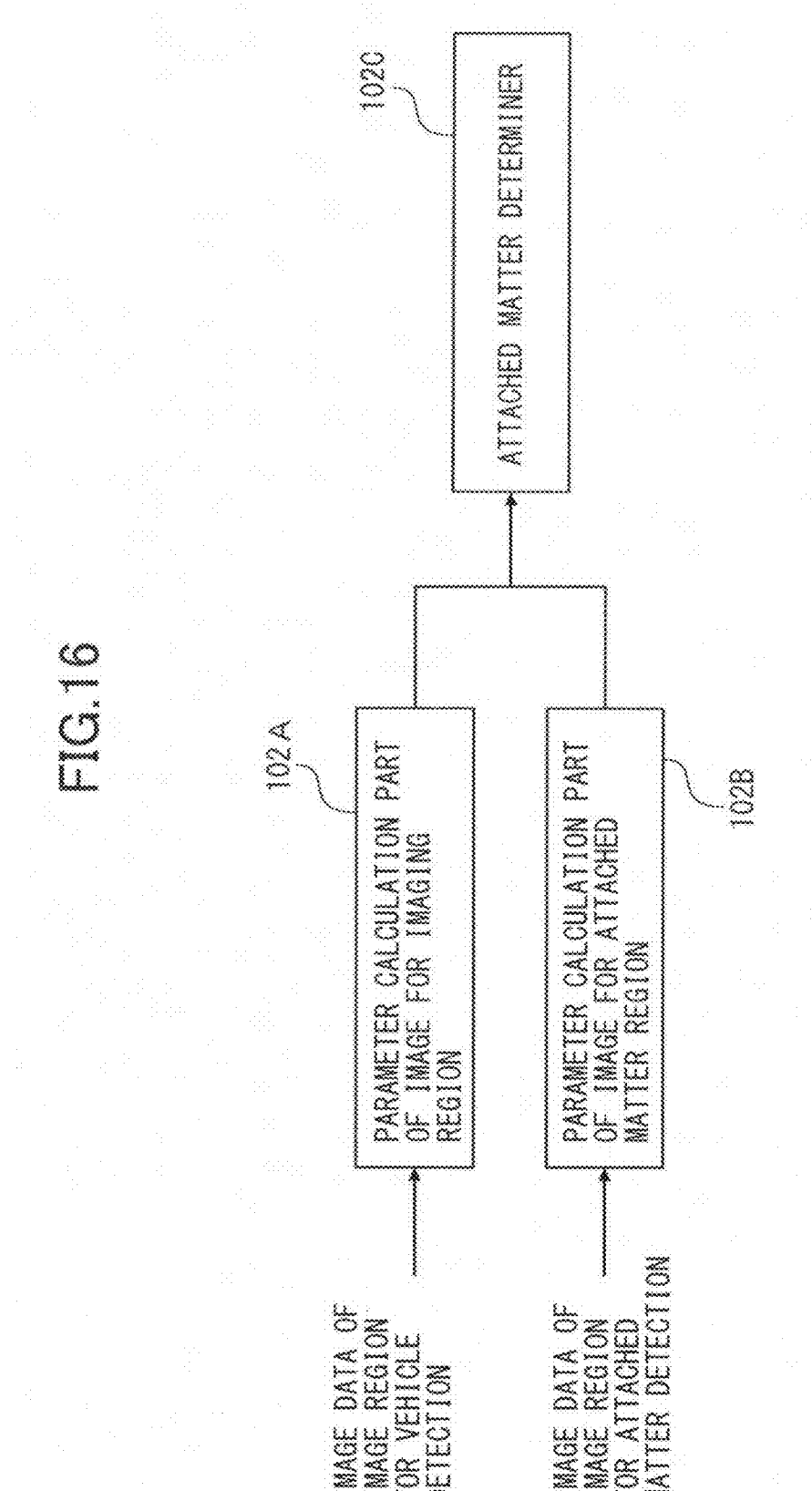
FIG. 16 is a functional block diagram of main parts of an image analysis unit for a detection operation of a state of a front window in the present embodiment.

FIG. 16 is a functional block diagram of chief parts of the image analysis unit 102 regarding the detection operation of the state of the front window.

In the present embodiment, two kinds of image data of image data for imaging (for detection of vehicles, or the like) of the image region for vehicle detection 213, and image data for imaging (for attached matter detection) of the image region for attached matter detection 214 are obtained. A parameter calculation part of an image for an imaging region 102A functions as a parameter calculator of an image for an imaging region, which generates a parameter of an image for an imaging region from image data of the image region for vehicle detection 213, and sends it to an attached matter determiner 102C. A parameter calculation part of an image for an attached matter image region 102B functions as a parameter calculator of an image for an attached matter image region, which generates a parameter of an image for an attached matter image region from image data of the image region for attached matter detection 214, and sends it to the attached matter determiner 102C. The attached matter determiner 102C functions as an output device of an attached matter state signal, which determines a state of attached matter based on the parameter of the image for the imaging region, and the parameter of the image for the attached matter image region. And then, a signal that shows a result of the above determination is outputted from the attached matter determiner 102C to various control units, which perform windshield wiper control and defroster control, and are used for the windshield wiper control and the defroster control.

As the parameter of the image for the imaging region, parameters based on an exposure time, a brightness value, an edge extraction result of an image in front (an extraction result of an edge of a hood, for example), and the like in the image region for vehicle detection 213 are included. As the parameter of the image for the attached matter image region, parameters based on a brightness average value, a brightness dispersion value, attachment occupancy of attached matter, and the like in the image region for attached matter detection 214 are included. Input parameters to the attached matter determiner 102C are not limited to the above, and parameters such as outside air temperature, and the like can be inputted.

Figure 17:
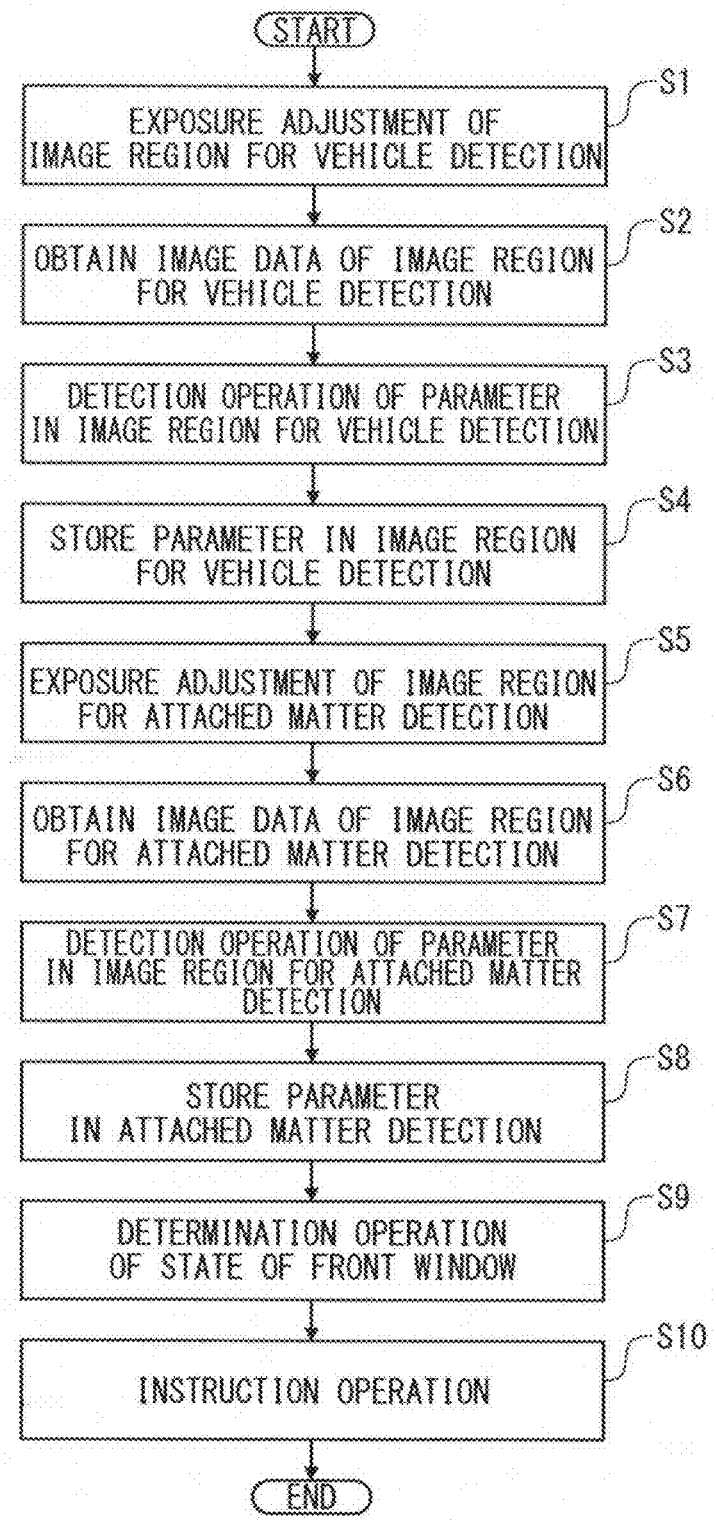
FIG. 17 is a flow diagram illustrating a flow of the detection operation of the state of the front window.

FIG. 17 is a flow diagram illustrating a flow of the detection operation of the state of the front window performed by the image analysis unit 102.

The filter part for attached matter detection 205B that includes the spectral filter layer 211 receives a smaller amount of light compared with the filter part for vehicle detection 205A that does not includes the spectral filter layer 211. Therefore, there is a large difference between an amount of light transmitted through the filter part for attached matter detection 205B and that transmitted through the filter part for vehicle detection 205A. Accordingly, there is a large difference between an imaging condition (an exposure amount, or the like) suitable for the image region for vehicle detection 213 corresponding to the filter part for vehicle detection 205A and that suitable for the image region for attached matter detection 214 corresponding to the filter part for attached matter detection 205B. In the present embodiment, different exposure amounts are used for imaging (for detection of vehicles, or the like) of the image region for vehicle detection 213 and for imaging (for attached matter detection) of the image region for attached matter detection 214.

For example, regarding exposure amount adjustment for the detection of vehicles, or the like, automatic exposure adjustment is performed based on an output of the image sensor 206 corresponding to the image region for vehicle detection 213 (Step S1), and regarding exposure amount adjustment for attached matter detection, an exposure amount is adjusted to a predetermined fixed exposure amount (Step S5). In a case of changing an exposure amount, an exposure time is changed, for example. The change of the exposure time, for example, is performed by the image analysis unit 202, by controlling time to convert an amount of light received to an electric signal performed by the image sensor 206.

As for the image region for vehicle detection 213, surroundings around a vehicle are imaged, illuminance around the vehicle changes from several tens of thousands luxes in the daytime to less than or equal to 1 lux in the nighttime, and the amount of the light received greatly changes depending on imaging scenes. Accordingly, it is necessary to appropriately adjust the exposure amount depending on the imaging scenes. Therefore, it is preferable to perform the exposure amount adjustment by known automatic exposure control on the image region for vehicle detection 213. On the other hand, as for the image region for attached matter detection 214, since an image is imaged by receiving light emitted from the light source 202, which emits light of a certain intensity, via the optical filter 205 transmittance of which is known, change of the amount of the light received is small. Therefore, as for the image region for attached matter detection 214, without performing the automatic exposure adjustment, it is possible to perform imaging in a fixed exposure time. Using the fixed exposure time makes it possible to shorten a control time of the exposure amount, and simplify exposure amount control.

In the present embodiment, firstly, exposure adjustment is performed on the image region for vehicle detection 213 (Step S1), and then, in the image analysis unit 102, image data of the image region for vehicle detection 213 is obtained (Step S2). In the present embodiment, the image data of the image region for vehicle detection 213, as described later, is used not only for detection of a vehicle, a white line, a road sign, and the like, but also for windshield wiper control, defroster control, and the like. Therefore, the image analysis unit 102 that has obtained the image data of the image region for vehicle detection 213 performs detection of a parameter for the windshield wiper control and the defroster control in the image region for vehicle detection 213 (Step S3), and stores the detected parameter in a predetermined storage area (Step S4).

Figure 18:
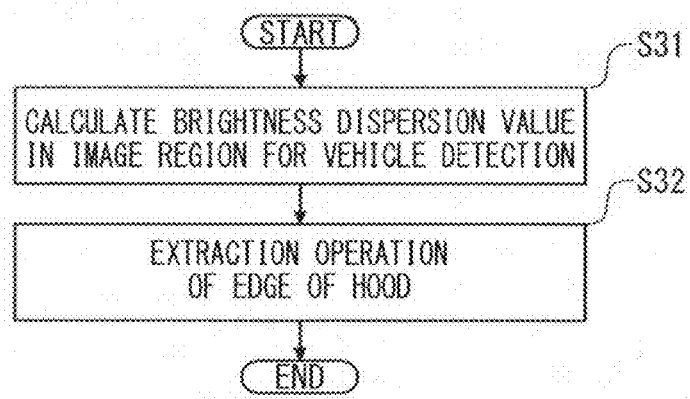
FIG. 18 is a flow diagram illustrating a flow of an operation to perform parameter detection for windshield wiper control and for defroster control from image data of the image region for vehicle detection.

FIG. 18 is a flow diagram illustrating a flow of an operation for performing the detection of the parameter for the windshield wiper control and the defroster control from the image data of the image region for vehicle detection 213 (the detection of the parameter for the windshield wiper control and the defroster control in the image region for vehicle detection 213).

In the present embodiment, as a parameter for the windshield wiper control and the defroster control in the image region for vehicle detection 213, a brightness dispersion value in the image region for vehicle detection 213 is calculated (Step S31). Additionally, in the present embodiment, as the above parameter, an imaging region is set so as to detect an edge part between a hood of the driver's vehicle 100 and a background, and a result of edge extraction of the hood is also used (Step S32).

Figure 19:
FIG. 19 is an explanatory diagram illustrating an imaged image in a state where a front window is fogging.
Figure 20:
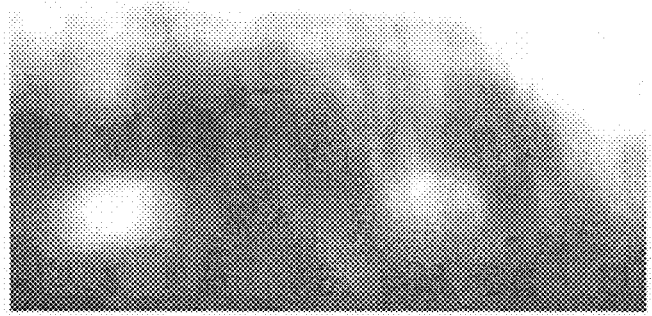
FIG. 20 is an explanatory diagram illustrating an imaged image in a state where a front window is frozen.

When the front window 105 is fogging as illustrated in FIG. 19, or is frozen as illustrated in FIG. 20, in an image of the image region for vehicle detection 213, the brightness dispersion value becomes small. Therefore, the brightness dispersion value in the image region for vehicle detection 213 is useful for detection whether the front window 105 is fogging or frozen. In addition, when the front window 105 is fogging or frozen, it is difficult to extract the edge part of the hood. Therefore, information whether it is possible to extract the edge part of the hood or not is also useful for the detection whether the front window 105 is fogging or frozen.

Next, on the image region for attached matter detection 214, exposure adjustment (exposure time adjustment) based on power of the light source 202 and a spectral characteristic of a spectral filter layer of the optical filter 205 is performed (Step S5). And then, in the image analysis unit 102, image data of the image region for attached matter detection 214 is obtained (Step S6). And the image analysis unit 102 performs detection of a parameter for the windshield wiper control and the defroster control in the image region for attached matter detection 214 from the image data of the image region of attached matter detection 214 (Step S7), and stores the detected parameter in a predetermined storage area (Step S8).

Figure 21:
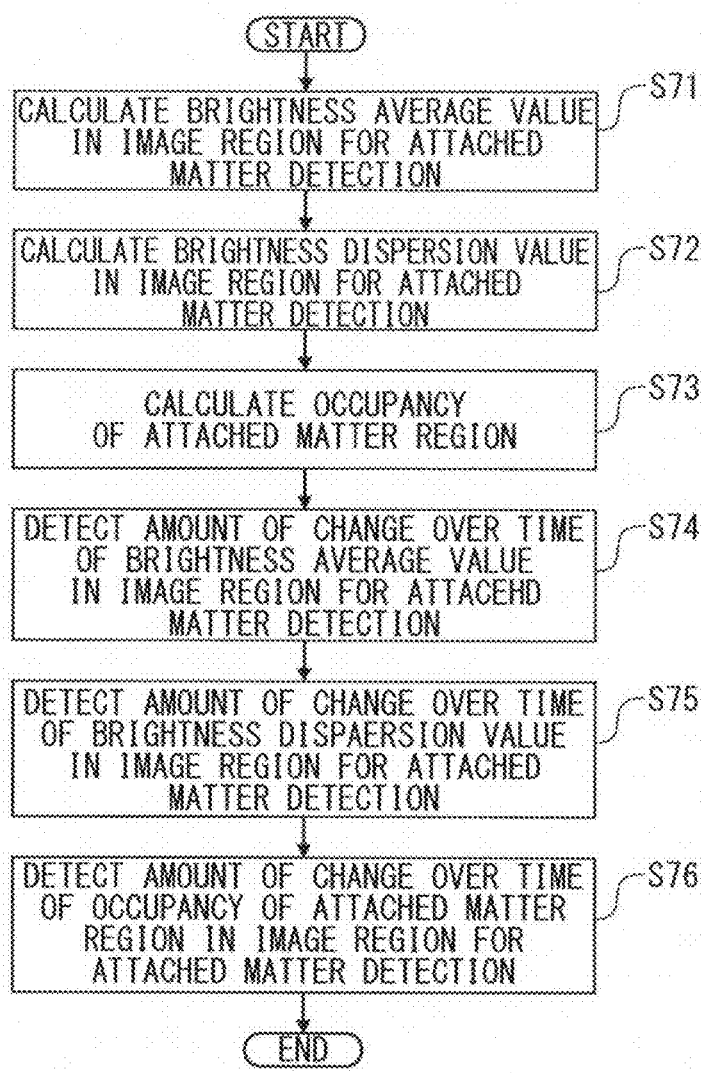
FIG. 21 is a flow diagram illustrating a flow of an operation to perform parameter detection for windshield wiper control and for defroster control from image data of the image region for attached matter detection.

FIG. 21 is a flow diagram illustrating a flow of an operation for performing the detection of the parameter for the windshield wiper and the defroster control from the image data of the image region for attached matter detection 214 (the detection of the parameter for the windshield wiper control and the defroster control in the image region for attached matter detection 214).

In the present embodiment, as a parameter for the windshield wiper control and the defroster control in the image region for attached matter detection 214, a brightness average value in the image region for attached matter detection 214 is calculated (Step S71). In the present embodiment, when a raindrop, a fogging portion, a frozen portion, or the like is attached on the front window 105, reflected light reflected by an interfacial surface between that and air is shown in the image region for attached matter detection 214. And when a smudge such as a dropping of a bird, or the like is attached on the front window 105, reflected light reflected by an interfacial surface between the smudge and the front window 105 is shown in the image region for attached matter detection 214. Therefore, when such attached matter is attached on the front window 105, the brightness average value in the image region for attached matter detection 214 increases. Accordingly, it is possible to detect whether such attached matter is attached or not by the brightness average value in the image region for the attached matter detection 214.

Additionally, as a parameter for the windshield wiper control and the defroster control in the image region for attached matter detection 214, a brightness dispersion value in the image region for attached matter detection 214 is calculated (Step S72). In a case of drizzle (in a case where the size of a raindrop is small), since a total area of raindrops shown in the image region for attached matter 214 is small, the brightness dispersion value does not change much compared with a state where nothing is attached on the front window 105. However, when the number of raindrops of relatively large sizes attached on the front window 105 increases, the brightness dispersion value decreases. This is because blurred images of the raindrops are overlapped. Also in a case where the front window 105 is fogging or frozen, the brightness dispersion value decreases, likewise. Therefore, it is possible to detect whether attached matter on the front window 105 is something like drizzle, or the like.

Additionally, in the present embodiment, as a parameter for the windshield wiper control and the defroster control in the image region for attached matter detection 214, occupancy of an attached matter region in the image region for attached matter detection 214 is calculated (Step S73). The term "attached matter region" is the ratio of the number of pixels (an area of an image) the brightness average value of which exceeds a specified value in the image region for attached matter detection 214 to all the number of pixels (a total area) in the image region for attached matter detection 214. As for the fogging portion, the frozen portion, or the like, the occupancy of the attached matter region is generally large, and therefore, it is possible to detect whether the attached matter attached on the front window 105 is not something like drizzle but fogging or freezing by the occupancy of the attached matter region in the image region for attached matter detection 214.

Additionally, in the present embodiment, as a parameter for the windshield wiper control and the defroster control in the image region for attached matter detection 214, an amount of change over time regarding the above-described brightness average value, brightness dispersion value, and occupancy of the attached matter region is detected (Steps S74-S76). The amount of change overtime means an amount of change between image data of the image region for attached matter detection 214 imaged this time and image data of the image region for attached matter detection 214 imaged last time. Freezing, fogging, or the like does not drastically increase in a short time; however, a splash (spray of water splashed by another vehicle, or the like) attached on the front window 105 increases drastically in a short time. Therefore, it is possible to detect whether the attached matter attached on the front window 105 is a splash or not by the amount of change over time regarding the brightness average value, brightness dispersion value, and occupancy of the attached matter region in the image region for attached matter detection 214.

Thus, after storing the parameters detected for the windshield wiper control and the defroster control, a determination operation of a state of the front window 105 is performed (Step S9).

FIG. 22 is a flow diagram illustrating a flow of the determination operation of the state of the front window 105.

FIG. 23 is a table of criteria for determination of the determination operation of the state of the front window 105.

In the determination operation of the state of the front window 105, firstly, it is determined whether the exposure time determined by the automatic exposure adjustment regarding the image region for vehicle detection 213 performed in the above Step S1 is shorter than a threshold value A (40 ms, for example) or not (Step S91). In a case where the exposure time is set to a time considerably longer than the threshold value A, it can be determined to be nighttime in which an amount of light in an imaging region is small. Therefore, it is possible to identify whether the imaging region is daytime or nighttime by the determination whether the exposure time is shorter than the threshold value A or not.

In a case where the imaging region is the nighttime, determination accuracy of the state of the front window 105 by the parameters (brightness difference, extraction result of edge of hood) obtained from the image data of the image region for vehicle detection 213 becomes low. Therefore, in the present embodiment, in a case where it is determined to be the nighttime, the determination of the state of the front window 105 is performed by not using the parameters obtained from that of the image region for vehicle detection 213 (brightness difference, extraction result of edge of hood), but using only the parameters obtained from that of the image region for attached matter detection 214.

In a case where the imaging region is determined to be the daytime in the above Step S91, then, it is determined whether the brightness difference in the image region for vehicle detection 213 is larger than a threshold value B or not (Step S92). A result of this determination is stored in a predetermined storage area. As for the threshold value B, it is preferable to prepare a table according to the exposure time by an experiment, or the like, and determine the threshold value B used depending on each exposure time.

Additionally, in the case where the imaging region is determined to be the daytime in the above Step S91, it is determined whether the edge part of the hood in the image region of vehicle detection 213 is extracted or not (Step S93). A result of this determination is stored in a predetermined storage area. The extraction of the edge part of the hood, for example, regarding an image area including the hood and the background, from change in brightness of adjacent pixels in the vertical direction of an image, a differential image of a horizontal edge component of the image is formed, and comparison of patterns of the above differential image to a differential image of a horizontal edge component stored in advance is performed. In a case where an error in each pattern matching in each part detected based on a result of each pattern comparison is less than or equal to a predetermined threshold value, it is determined that the edge part of the food is detected. In a case where the edge part is extracted, it is possible to determine that fogging, freezing, or a water splash does not occur on the front window 105.

Next, determinations of various kinds of the parameters obtained from the image region for attached matter detection 214 are performed.

Firstly, it is determined whether the brightness average value in the image region for attached matter detection 214 is larger than a threshold value C or not (Step S94). A result of this determination is stored in a predetermined storage area. As described above, when a raindrop or the like is attached on the front window 105, the brightness average value increases. For example, if the brightness range of the image region for attached mater detection 214 is represented by 1024 scales, it is determined whether the brightness average value larger than 70 (threshold value C) excluding a noise component is detected or not.

In addition, it is determined whether the brightness dispersion value in the image region for attached matter detection 214 is smaller than a threshold value D or not (Step S95). A result of this determination is stored in a predetermined storage area. For example, if the brightness range of the image region for attached mater detection 214 is represented by 1024 scales, it is possible to determine that the front window 105 is fogging, frozen, or the like, when the brightness dispersion value is smaller than 50 (threshold value D).

Additionally, it is determined whether the amount of change over time of the brightness average value in the image region for attached matter detection 214 is smaller than a threshold value E or not (Step S96). A result of this determination is stored in a predetermined storage area. When the amount of change over time of the brightness average value is equal to or more than the threshold value E, for example, a case where the brightness average value in the image region for attached matter detection 214 imaged this time is equal to or more than 200 despite the imaged last time being less than or equal to 70, or the like, it is possible to determine that the water splash occurs.

Additionally, it is determined whether the occupancy of the attached matter region in the image region for attached matter detection 214 is smaller than a threshold value F or not (Step S97). A result of this determination is stored in a predetermined storage area. For example, in a case where light from the light source 202 is evenly illuminated, in a region where the brightness average is equal to or more than 70, when the occupancy is less than 1/5 (threshold value F), it is determined to be drizzle, and when the occupancy is equal to or more than 1/5, it is possible to determine that attached matter other than the drizzle is attached.

Additionally, in the present embodiment, as a parameter for the windshield wiper control and the defroster control, a result of detection of the outside air temperature sensor 111 is used, and it is determined whether the outside air temperature detected by the outside air temperature sensor 111 is larger than a threshold value G or not (Step S98). A result of this determination is stored in a predetermined storage area. For example, in a case where the outside air temperature is less than or equal to 0 degrees Celsius (threshold value G), it is determined that it is snowing or frozen.

When the result of determination regarding each parameter as described above is obtained, the determination of the state of the front window 105 is performed based on consistency between the result of the determination of each parameter and a table shown in FIG. 23 (Step S99). In this determination of the state, it is preferable to perform weighting on the result of the determination regarding each parameter. For example, a weighting coefficient regarding the parameters based on the image region for attached matter detection 214 and the outside temperature is taken as 10, and a weighting coefficient regarding the parameters based on the image region for vehicle detection 213 is taken as 5. And as a result of the determination of each parameter, a result in which there is a difference from "normal" is taken as 1, and a result in which there is no difference from "normal" is taken as 0. And then, with respect to the sum in which the result of the determination of each parameter is multiplied by the weighting coefficient, determination of a threshold value is performed. Thus, even in a case where the result of the determination of each parameter does not exactly match with the table shown in FIG. 23, it is possible to determine the state of the front window 105.

Additionally, as for the parameters of the image region for attached matter detection 214, in a case of the result in which there is the difference from "normal", after operating the windshield wiper only once, the determination of the state regarding each parameter can be confirmed again.

After thus having the result of the determination of the state of the front window 105, then, the image analysis unit 102 issues an instruction to perform an operation depending on the result of the determination of the state, and the controls (the windshield wiper control and the defroster control) (Step S10). This instruction operation is performed based on a table shown in FIG. 24. As for the windshield wiper control, the speed of the windshield wiper is controlled at three levels (slow, medium, and fast), and as for the defroster control, it is controlled whether an operation that blows hot air with maximum air volume to the inner surface of the front window 105 is performed or not.

The above explanation is an example, and the embodiment of the present invention has a specific effect per aspect below.
(Aspect A)

An attached matter detector includes a light source 202 that emits light toward a transparent member such as a front window 105, or the like; an imager such as an imaging device 200 or the like that receives transmitted light transmitted through the transparent member from a predetermined imaging region on a light-receiving region for the predetermined imaging region (a portion corresponding to an image region for vehicle detection 213) and images an image of the imaging region, and receives reflected light on a predetermined light-receiving region for attached matter detection (a portion corresponding to an image region for attached matter detection 214) when light emitted from the light source is reflected by attached matter such as a raindrop 203, or the like attached on the transparent member, and images an image of the attached matter; and an attached matter detection operation device such as an image analysis unit 102, or the like that performs an attached matter detection operation that detects the attached matter based on the image imaged by the imager, and the attached matter detection operation device performs the attached matter detection operation by using image information of the attached matter imaged by the imager and image information of the imaging region.

In a state of the daytime in which a lot of ambient light (sunlight, etc) is incident onto the light-receiving region for attached matter detection, a S/N (signal to noise) ratio of an image of attached matter is small, and detection accuracy of the attached matter becomes low.

According to the present Aspect A, in the state of daytime, by performing an attached matter detection by using not only the image information of attached matter, but also the image information of the imaging region, it is possible to improve the detection accuracy of the attached matter.

(Aspect B)

In the above Aspect A, by an image sensor 206 constituted by an imaging pixel array where a light-receiving element is two-dimensionally arranged, via an optical filter 205, the imager receives transmitted light transmitted through the transparent member from the imaging region, and reflected light reflected by the attached matter attached on the transparent member. The light source 202 emits light in a specific wavelength range such as an infrared light range deviated from a visible light wavelength region. The optical filter 205 has a first filter part such as a first spectral filter layer 223, or the like that selectively transmits the light in the specific wavelength range and light in the visible light wavelength range, and cuts at least light in a wavelength range sandwiched between those wavelength ranges, in a portion corresponding to both of the light-receiving region for the imaging region and the light-receiving region for attached matter detection, and has a second filter part such as a spectral filter layer 211, or the like that selectively transmits the light in the specific wavelength range, and cuts at least the light in the visible light wavelength range, in a portion corresponding to the light-receiving region for attached matter detection.

According to the above, as for an image of the imaging region, since the first filter part cuts a wavelength range adjacent to the visible light wavelength range (the wavelength range sandwiched between the specific wavelength range and the visible light wavelength range), an appropriate image of the visible light wavelength range is obtained. Additionally, as for an image of the attached matter, since the second filter part cuts the light in the visible light wavelength region, it is possible to suppress ambient light other than the light from the light source, and improve detection accuracy of the attached matter.

(Aspect C)

In the above Aspect B, in the optical filter 205, the second filter part is formed on a surface on a side of an image sensor on a transparent substrate of a filter substrate 221, or the like, and the first filter part is formed on a surface on a side opposite to the side of the image sensor on the transparent substrate, and is bonded on the image sensor.

According to the above, it is possible to achieve simplification of defect management, and easily possible to achieve cost reduction.

(Aspect D)

In any one of the above Aspects A to C, the image information of the attached matter used in the attached matter detection operation includes a brightness average value and a brightness dispersion value. The image information of the imaging region used in the attached matter detection operation includes a brightness dispersion value. The attached matter detection operation device determines a state of a surface of the transparent member to be at least one of a state of fogging and a state of freezing by performing the attached matter detection operation.

According to the above, it is possible to highly-accurately determine whether the state of the surface of the transparent member is fogging, or frozen.

(Aspect E)

In any one of the above Aspects A to D, at least one of the image information of the attached matter and the image information of the imaging region used in the attached matter detection includes an amount of change over time of the brightness average value. The attached matter detection operation device detects whether the attached matter attached on the surface of the transparent member is a splash or not by performing the attached matter detection operation.

According to the above, it is possible to highly-accurately detect whether the attached matter is attached on the surface of the transparent member by the splash or not. Note that the term "splash" is a typical splash of a liquid such as water, or the like, and means attached matter that is attached in large amounts in a short time.

(Aspect F)

In any one of the above Aspects A to E, the imager images each image with different exposure amounts when imaging the image of the imaging region and when imaging the image of the attached matter.

According to the above, it is possible to image each image with an optimal exposure amount.

(Aspect G)

In the above Aspect F, the imager uses an exposure amount determined depending on an amount of light received in the light-receiving region for imaging region as an exposure amount when imaging the image of the imaging region, and uses a fixed exposure amount determined in advance depending on intensity of the light emitted from the light source as an exposure amount when imaging the image of the attached matter.

According to the above, it is possible to achieve simplification of exposure amount adjustment of the image of the attached matter, and time reduction.

(Aspect H)

An in-vehicle device controller includes an attached matter detector that detects attached matter such as a raindrop 203, or the like attached on a window glass of a front window 105, or the like of a driver's vehicle as a transparent member based on information of an imaged image of an imager that images an image of an imaging region around the driver's vehicle (front region of the driver's vehicle, or the like) and images an image of the attached matter, and a controller such as a windshield wiper control unit 106, a defroster control unit 109, or the like that controls a windshield wiper 107, a defroster 110, or the like included in the driver's vehicle depending on a result of detection of the attached matter detector, and as the attached matter detector, the attached matter detector according to any one of the above Aspects A to G is used.

According to the above, since the detection accuracy of the attached matter is high even in the daytime in which a lot of ambient light (sunlight, or the like) is incident onto the light-receiving region for attached matter detection, it is possible to perform appropriate control of an in-vehicle device.

(Aspect I)

In the above Aspect H, an in-vehicle device controlled by the controller includes a defroster.

According to the above, it is possible to reduce, or eliminate a chance of manual control of the defroster by a driver of the driver's vehicle 100 while driving, and it is possible to achieve safe driving by the driver.

(Aspect J)

In the above Aspect H or Aspect I, an in-vehicle device controlled by the controller includes a windshield wiper.

According to the above, it is possible to reduce, or eliminate a chance of manual control of the windshield wiper by a driver of the driver's vehicle 100 while driving, and it is possible to achieve safe driving by the driver.

In the embodiment of the present invention, an attached matter detection operation including an operation that detects a state of attached matter using not only image information of attached matter based on reflected light by the attached matter of light emitted from a light source (parameter of an image for an attached matter image region), but also image information of an imaging region based on transmitted light from a predetermined imaging region transmitted through a transparent member is performed. In light received in a light-receiving region for imaging region, light from the attached matter attached on the transparent member is incident, and therefore, image information of the attached matter is included. Here, most of ambient light incident in a light-receiving region for attached matter detection is light transmitted through the transparent member (sunlight, etc). Therefore, in a case where a lot of ambient light is incident in the light-receiving region for attached matter detection, there are many cases in which a state where there is a lot of light transmitted through the transparent member, that is, a state where there is a lot of light in the imaging region (daytime, or the like). In such a state, an S/N ratio of an image of the attached matter is small and detection accuracy of the attached matter becomes low; however, on the other hand, in the light received in the light-received region for imaging region, a lot of light transmitted via or reflected by the attached matter is included. That is, in a case where the detection accuracy of the attached matter based on the image of the attached matter becomes low, the image information of the attached matter included in the image information of the imaging region increases, and the image information of the imaging region is useful for detection of the attached matter. Therefore, by performing the attached matter detection operation using not only the image information of the attached matter but also the image information of the imaging region, it is possible to improve the detection accuracy of the attached matter in a case where the detection accuracy of the attached matter based on the attached matter becomes low, and highly-accurately detect a state of the attached matter attached on the transparent member.

According to the embodiment of the present invention, it is possible to improve the detection accuracy of the attached matter under circumstances where a lot of ambient light is incident in the image region for attached matter detection.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An attached matter detector comprising:
a light source that emits light toward a transparent member;
an imager that receives transmitted light transmitted through the transparent member from a predetermined imaging region on a light-receiving region for a predetermined imaging region and images an image of the imaging region, receives reflected light on a predetermined light-receiving region for attached matter detection when light emitted from the light source is reflected by attached matter attached on the transparent member, and images an image of the attached matter;
a parameter calculator that calculates a parameter of an image for an attached matter image region as image information of an image region of the attached matter imaged by the imager;
a parameter calculator that calculates a parameter of an image for an imaging region as image information of the imaging region; and
an output device that outputs a signal that shows a state of the attached matter based on the calculated parameter of the image for the attached matter image region and the calculated parameter of the image for the imaging region,
wherein at least one of the parameter of the image for the attached matter image region and the parameter of the image for the imaging region includes a brightness dispersion value.

2. The attached matter detector according to claim 1, wherein
an exposure time and a result of an edge extraction of the image of the imaging region determined by automatic exposure adjustment are included in the parameter of the image for the imaging region, and
the output device uses a determination result corresponding to the exposure time to determine the state of the attached matter.

3. The attached matter detector according to claim 1, wherein
a brightness average value and a brightness dispersion value are included in the parameter of the image for the imaging region, and
a brightness dispersion value is included in the parameter of the image of the attached matter image region, and
at least one of a state of fogging and a state of freezing are included in a determination object of the attached matter attached on the transparent member.

4. The attached matter detector according to claim 1, wherein an amount of change over time of a brightness average value is included in at least one of the parameter of the image for the imaging region and the parameter of the image for the attached matter image region.

5. The attached matter detector according to claim 1, wherein the imager images each image with different exposure amounts when imaging the image of the imaging region and when imaging the image of the attached matter.

6. The attached matter detector according to claim 5, wherein the imager uses an exposure amount determined depending on an amount of light received on the light-receiving region for attached matter detection as an exposure amount when imaging the image of the imaging region, and uses a fixed exposure amount determined in advance depending on intensity of light emitted from the light source as an exposure amount when imaging the image of the attached matter.

7. An in-vehicle device controller comprising:
an attached matter detector that detects attached matter attached on a window glass as a transparent member of a driver's vehicle based on information of an imaged image imaged by an imager that images an image of an imaging region around the driver's vehicle and images an image of the attached matter; and
a controller that controls an in-vehicle device included in the driver's vehicle depending on a result of detection of the attached matter detector,
wherein as the attached matter detector, the attached matter detector according to claim 1 is used.

8. The in-vehicle device controller according to claim 7, wherein a defroster is included in the in-vehicle device controlled by the controller.

9. The in-vehicle device controller according to claim 7, wherein a windshield wiper is included in the in-vehicle device controlled by the controller.

10. The attached matter detector according to claim 1, wherein at least one of a state of fogging and a state of freezing are included in a determination object of the attached matter attached on the transparent member.

11. The attached matter detector according to claim 1, wherein
at least one of states of fogging, freezing, and being splashed is included in a determination object of a state of the attached matter attached on the transparent member,
the parameter of the image for the image region includes a determination as to whether or not an edge of the image of the imaging region is extracted, and
the determination is made by comparing a result of an edge extraction of an image of an object in the imaging region with a result of an edge extraction of the image of the object stored in advance.

12. The attached matter detector according to claim 1, wherein
the parameter of the image for the attached matter image region includes an amount of change over time regarding occupancy of the attached matter image region, and
the output device outputs the signal to show the state of the attached matter as being splashed when the occupancy of the attached matter image region has drastically changed.

13. The attached matter detector according to claim 1, further comprising:
an outside air temperature acquisition device,
wherein the output device determines the state of the attached matter in accordance with a sum in which a result of determinations of a parameter of outside air temperature acquired by the outside air temperature acquisition device, the parameter of the image for the attached matter image region, and the parameter of the image for the imaging region are each multiplied by a weighting coefficient.

14. The attached matter detector according to claim 2, wherein
the output device identifies whether the imaging region is daytime or nighttime based upon the exposure time, and
the output device determines the state of the attached matter using only the parameter of the image for the attached matter image region when it is identified that the imaging region is nighttime.

\* \* \* \* \*